US012652154B2

(12) United States Patent
    Cai et al.

(10) Patent No.: US 12,652,154 B2
(45) Date of Patent: Jun. 9, 2026

(54) DATA PROCESSING METHOD, APPARATUS, DEVICE AND MEDIUM

(71) Applicant: Beijing Volcano Engine Technology Co., Ltd., Beijing (CN)

(72) Inventors: Quanwei Cai, Beijing (CN); Yu Lin, Beijing (CN); Yafei Wang, Beijing (CN); Daode Zhang, Beijing (CN); Ye Wu, Beijing (CN)

(73) Assignee: Beijing Volcano Engine Technology Co., Ltd., Beijing (CN)

( * ) Notice: Subject to any disclaimer, the term of this patent is extended or adjusted under 35 U.S.C. 154(b) by 514 days.

(21) Appl. No.: 18/352,660

(22) Filed: Jul. 14, 2023

(65) Prior Publication Data

US 2024/0356724 A1 Oct. 24, 2024

(30) Foreign Application Priority Data

Apr. 23, 2023 (CN) .......................... 202310443647.0

(51) Int. Cl.
    *H04L 9/00* (2022.01)
    *H04L 9/06* (2006.01)
(52) U.S. Cl.
    CPC ............ *H04L 9/008* (2013.01); *H04L 9/0618* (2013.01)
(58) Field of Classification Search
    CPC ............................. H04L 9/008; H04L 2209/46
    See application file for complete search history.

(56) References Cited

U.S. PATENT DOCUMENTS

| | | | | |
|---|---|---|---|---|
| 11,874,950 B1 * | 1/2024 | Du | ...................... | H04L 63/0421 |
| 2023/0053566 A1 * | 2/2023 | Horne | ................. | G06F 21/6227 |
| 2024/0323023 A1 * | 9/2024 | Zhou | ...................... | G06F 21/602 |

FOREIGN PATENT DOCUMENTS

| | | |
|---|---|---|
| CN | 113032840 A | 6/2021 |
| CN | 113065155 A | 7/2021 |

(Continued)

OTHER PUBLICATIONS

Buddhavarapu et al., "Private Matching for Compute", Cryptology ePrint Archive, May 20, 2020, pp. 1-20.

(Continued)

*Primary Examiner* — Vu V Tran

(57) ABSTRACT

A data processing method, an apparatus, a device and a medium are provided. The method includes: receiving a first set obtained by a second participant shuffling and ID-randomizing its set and replacing features with first-homo-morphic-ciphertexts; obtaining a second set by shuffling and ID-randomizing a collection set of the a first participant's set and imitation elements, and replacing features of collection set elements with second-homomorphic-ciphertexts and sending the second set to the second-participant; receiving a third set obtained by the second-participant splitting second homomorphic ciphertexts into second-shared-ciphertexts and second-shared-numbers and replacing the second-ho-momorphic-ciphertexts with the second-shared-ciphertexts; splitting the first-homomorphic-ciphertexts of intersection elements and confusion elements of third and fourth sets into first-shared-ciphertexts and first-shared-numbers; splitting a first/second preset value to obtain IDs of the intersection/confusion elements; constructing a first-feature-union-set according to the second-shared-ciphertexts, the first-shared-numbers and the IDs; and sending the first-shared-cipher-texts and the IDs to the second participant.

9 Claims, 11 Drawing Sheets

(56) References Cited

FOREIGN PATENT DOCUMENTS

| | | | |
|----|-------------|----|---------|
| CN | 113127916   | A  | 7/2021  |
| CN | 113434888   | A  | 9/2021  |
| CN | 113761563   | A  | 12/2021 |
| CN | 113806795   | A  | 12/2021 |
| CN | 114580012   | A  | 6/2022  |
| CN | 114996752   | A  | 9/2022  |
| CN | 115242371   | A  | 10/2022 |
| CN | 115473707   | A  | 12/2022 |
| CN | 115967491   | A  | 4/2023  |
| WO | 2022/121623 | A1 | 6/2022  |

OTHER PUBLICATIONS

European Search Report for EP Patent Application No. 23185563.6, Issued on Sep. 5, 2024, 10 pages.

Notice of Allowance received from Chinese patent application No. 202310443647.0 mailed on May 15, 2024, 6 pages (2 pages English Translation and 4 pages Original Copy).

Yang et al., "A Comprehensive Survey on Secure Outsourced Computation and Its Applications", IEEE, vol. 7, No. 1, Oct. 28, 2019, pp. 159426-159465.

Lifei et al., "Survey of Privacy Preserving Oriented Set Intersection Computation", Journal of Computer Research and Development, vol. 59, No. 08, 2022, pp. 1782-1799.

Office action received from Chinese patent application No. 202310443647.0 mailed on Mar. 13, 2024, 13 pages (6 pages English Translation and 7 pages Original Copy).

* cited by examiner

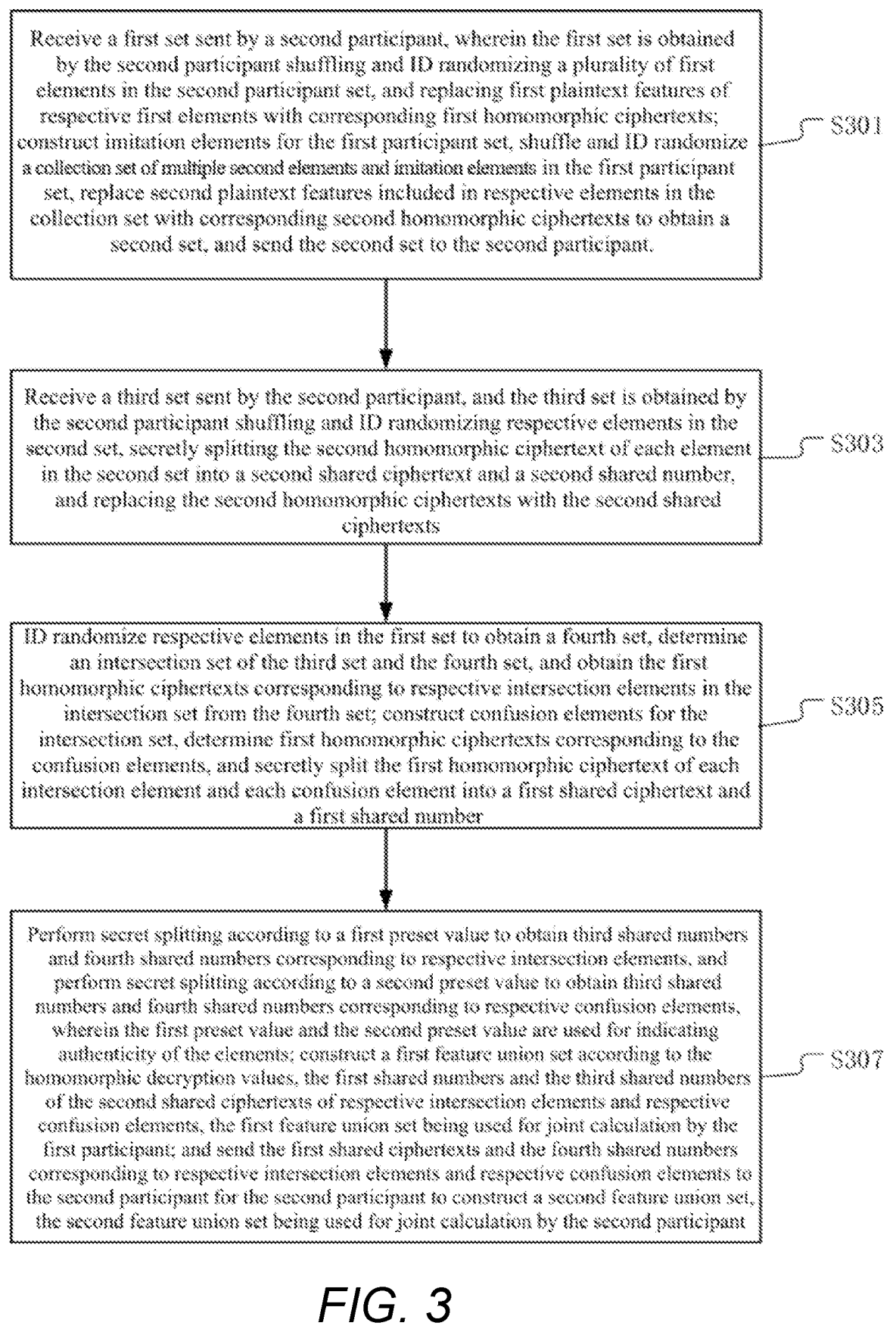

Receive a first set sent by a second participant, wherein the first set is obtained by the second participant shuffling and ID randomizing a plurality of first elements in the second participant set, and replacing first plaintext features of respective first elements with corresponding first homomorphic ciphertexts; construct imitation elements for the first participant set, shuffle and ID randomize a collection set of multiple second elements and imitation elements in the first participant set, replace second plaintext features included in respective elements in the collection set with corresponding second homomorphic ciphertexts to obtain a second set, and send the second set to the second participant. ⟶ S301

Receive a third set sent by the second participant, and the third set is obtained by the second participant shuffling and ID randomizing respective elements in the second set, secretly splitting the second homomorphic ciphertext of each element in the second set into a second shared ciphertext and a second shared number, and replacing the second homomorphic ciphertexts with the second shared ciphertexts ⟶ S303

ID randomize respective elements in the first set to obtain a fourth set, determine an intersection set of the third set and the fourth set, and obtain the first homomorphic ciphertexts corresponding to respective intersection elements in the intersection set from the fourth set; construct confusion elements for the intersection set, determine first homomorphic ciphertexts corresponding to the confusion elements, and secretly split the first homomorphic ciphertext of each intersection element and each confusion element into a first shared ciphertext and a first shared number ⟶ S305

Perform secret splitting according to a first preset value to obtain third shared numbers and fourth shared numbers corresponding to respective intersection elements, and perform secret splitting according to a second preset value to obtain third shared numbers and fourth shared numbers corresponding to respective confusion elements, wherein the first preset value and the second preset value are used for indicating authenticity of the elements; construct a first feature union set according to the homomorphic decryption values, the first shared numbers and the third shared numbers of the second shared ciphertexts of respective intersection elements and respective confusion elements, the first feature union set being used for joint calculation by the first participant; and send the first shared ciphertexts and the fourth shared numbers corresponding to respective intersection elements and respective confusion elements to the second participant for the second participant to construct a second feature union set, the second feature union set being used for joint calculation by the second participant ⟶ S307

FIG. 3

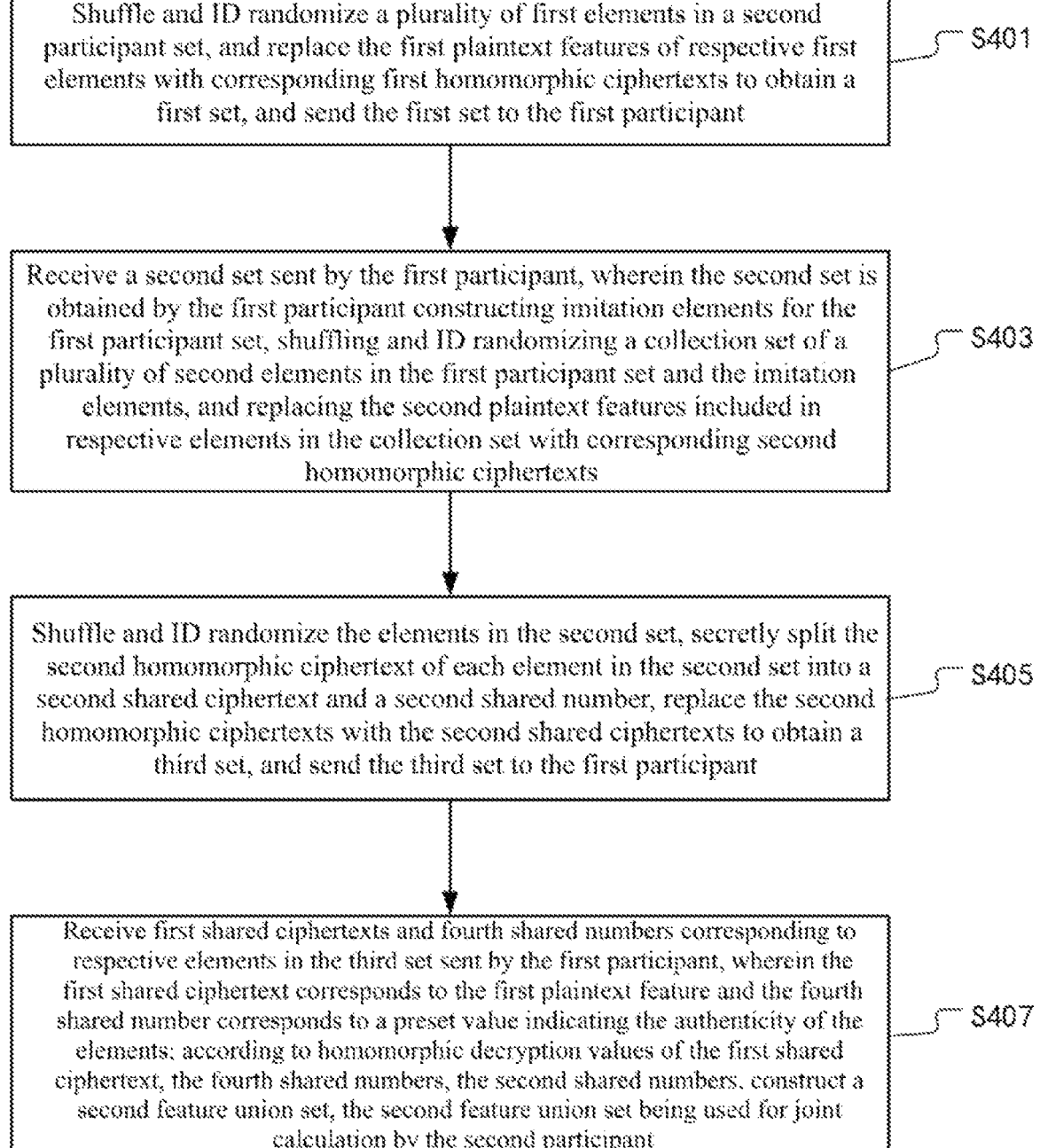

Shuffle and ID randomize a plurality of first elements in a second participant set, and replace the first plaintext features of respective first elements with corresponding first homomorphic ciphertexts to obtain a first set, and send the first set to the first participant ⟋⎼ S401

Receive a second set sent by the first participant, wherein the second set is obtained by the first participant constructing imitation elements for the first participant set, shuffling and ID randomizing a collection set of a plurality of second elements in the first participant set and the imitation elements, and replacing the second plaintext features included in respective elements in the collection set with corresponding second homomorphic ciphertexts ⟋⎼ S403

Shuffle and ID randomize the elements in the second set, secretly split the second homomorphic ciphertext of each element in the second set into a second shared ciphertext and a second shared number, replace the second homomorphic ciphertexts with the second shared ciphertexts to obtain a third set, and send the third set to the first participant ⟋⎼ S405

Receive first shared ciphertexts and fourth shared numbers corresponding to respective elements in the third set sent by the first participant, wherein the first shared ciphertext corresponds to the first plaintext feature and the fourth shared number corresponds to a preset value indicating the authenticity of the elements; according to homomorphic decryption values of the first shared ciphertext, the fourth shared numbers, the second shared numbers, construct a second feature union set, the second feature union set being used for joint calculation by the second participant ⟋⎼ S407

*FIG. 4*

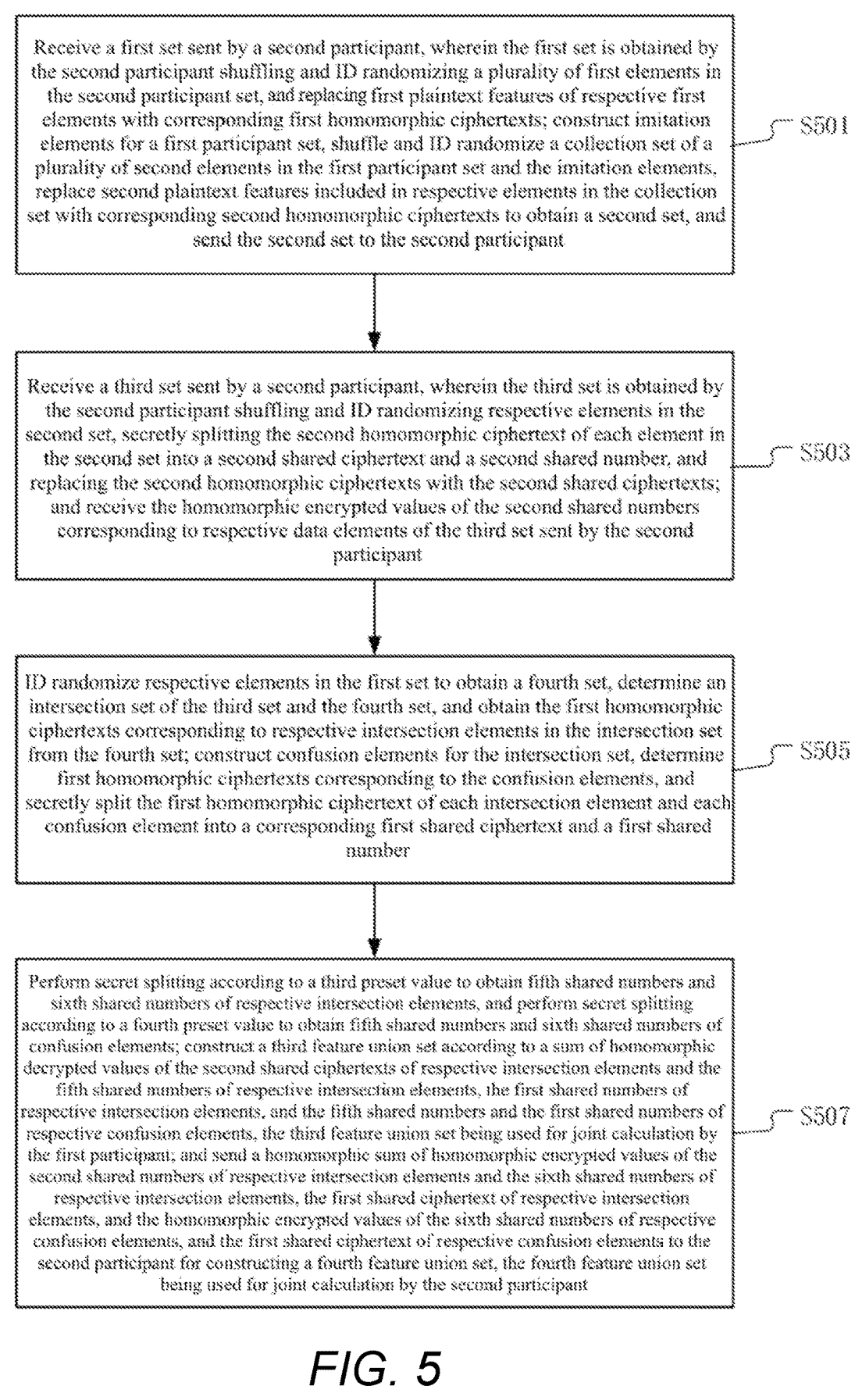

Receive a first set sent by a second participant, wherein the first set is obtained by the second participant shuffling and ID randomizing a plurality of first elements in the second participant set, and replacing first plaintext features of respective first elements with corresponding first homomorphic ciphertexts; construct imitation elements for a first participant set, shuffle and ID randomize a collection set of a plurality of second elements in the first participant set and the imitation elements, replace second plaintext features included in respective elements in the collection set with corresponding second homomorphic ciphertexts to obtain a second set, and send the second set to the second participant —— S501

Receive a third set sent by a second participant, wherein the third set is obtained by the second participant shuffling and ID randomizing respective elements in the second set, secretly splitting the second homomorphic ciphertext of each element in the second set into a second shared ciphertext and a second shared number, and replacing the second homomorphic ciphertexts with the second shared ciphertexts; and receive the homomorphic encrypted values of the second shared numbers corresponding to respective data elements of the third set sent by the second participant —— S503

ID randomize respective elements in the first set to obtain a fourth set, determine an intersection set of the third set and the fourth set, and obtain the first homomorphic ciphertexts corresponding to respective intersection elements in the intersection set from the fourth set; construct confusion elements for the intersection set, determine first homomorphic ciphertexts corresponding to the confusion elements, and secretly split the first homomorphic ciphertext of each intersection element and each confusion element into a corresponding first shared ciphertext and a first shared number —— S505

Perform secret splitting according to a third preset value to obtain fifth shared numbers and sixth shared numbers of respective intersection elements, and perform secret splitting according to a fourth preset value to obtain fifth shared numbers and sixth shared numbers of confusion elements; construct a third feature union set according to a sum of homomorphic decrypted values of the second shared ciphertexts of respective intersection elements and the fifth shared numbers of respective intersection elements, the first shared numbers of respective intersection elements, and the fifth shared numbers and the first shared numbers of respective confusion elements, the third feature union set being used for joint calculation by the first participant; and send a homomorphic sum of homomorphic encrypted values of the second shared numbers of respective intersection elements and the sixth shared numbers of respective intersection elements, the first shared ciphertext of respective intersection elements, and the homomorphic encrypted values of the sixth shared numbers of respective confusion elements, and the first shared ciphertext of respective confusion elements to the second participant for constructing a fourth feature union set, the fourth feature union set being used for joint calculation by the second participant —— S507

FIG. 5

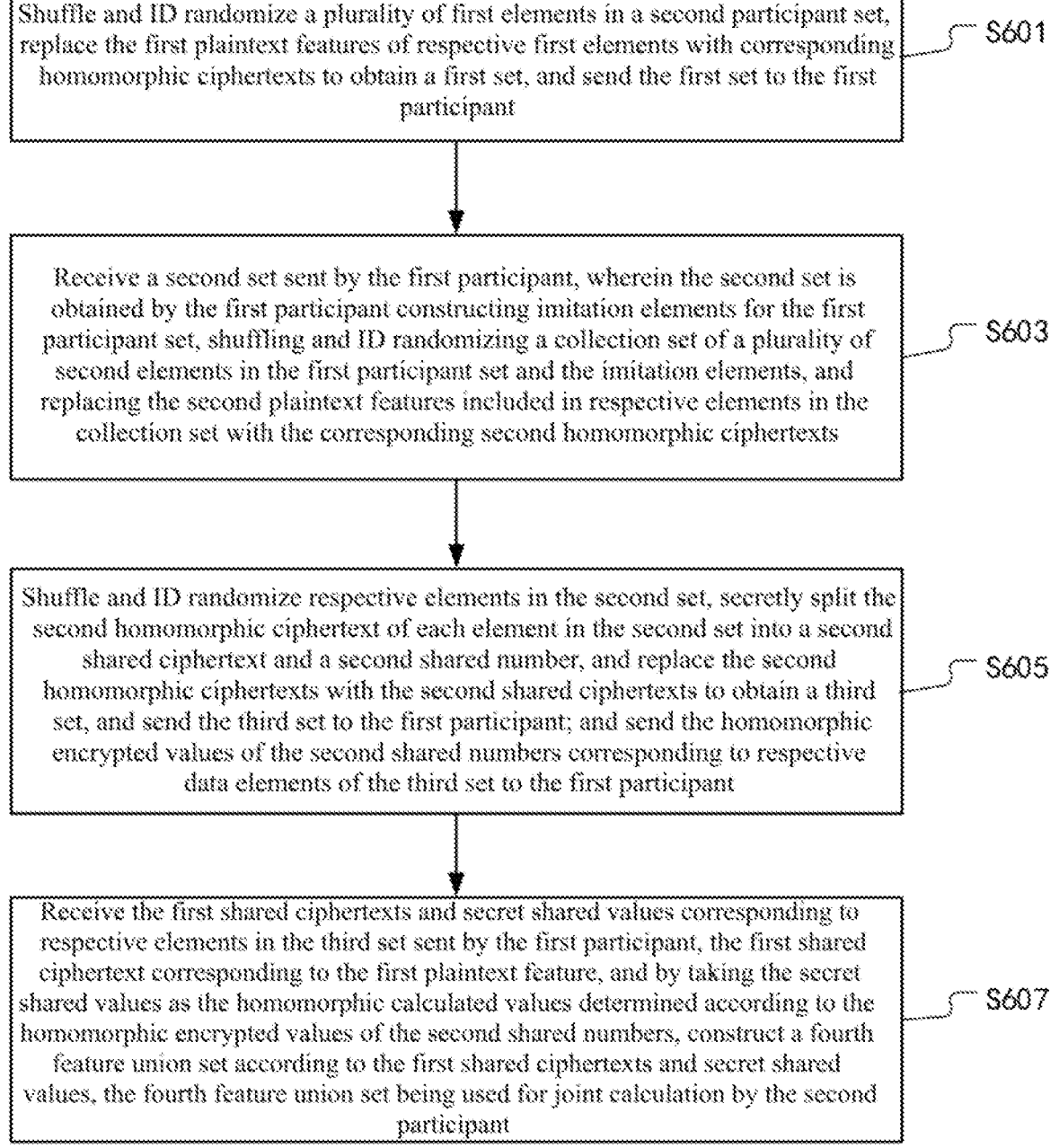

Shuffle and ID randomize a plurality of first elements in a second participant set, replace the first plaintext features of respective first elements with corresponding homomorphic ciphertexts to obtain a first set, and send the first set to the first participant — S601

Receive a second set sent by the first participant, wherein the second set is obtained by the first participant constructing imitation elements for the first participant set, shuffling and ID randomizing a collection set of a plurality of second elements in the first participant set and the imitation elements, and replacing the second plaintext features included in respective elements in the collection set with the corresponding second homomorphic ciphertexts — S603

Shuffle and ID randomize respective elements in the second set, secretly split the second homomorphic ciphertext of each element in the second set into a second shared ciphertext and a second shared number, and replace the second homomorphic ciphertexts with the second shared ciphertexts to obtain a third set, and send the third set to the first participant; and send the homomorphic encrypted values of the second shared numbers corresponding to respective data elements of the third set to the first participant — S605

Receive the first shared ciphertexts and secret shared values corresponding to respective elements in the third set sent by the first participant, the first shared ciphertext corresponding to the first plaintext feature, and by taking the secret shared values as the homomorphic calculated values determined according to the homomorphic encrypted values of the second shared numbers, construct a fourth feature union set according to the first shared ciphertexts and secret shared values, the fourth feature union set being used for joint calculation by the second participant — S607

FIG. 6

DATA PROCESSING METHOD, APPARATUS, DEVICE AND MEDIUM

CROSS REFERENCES TO RELATED APPLICATIONS

The present application claims the priority of the Chinese patent application No. 202310443647.0 filed on Apr. 23, 2023, for all purposes, the disclosure of which is incorporated herein by reference in its entirety as part of the present application.

TECHNICAL FIELD

The embodiment of the disclosure relates to the technical field of computer technology, and in particular, relates to a data processing method, apparatus, device and medium.

BACKGROUND

In existing schemes that utilize data sets of multiple participants for security calculation or joint analysis, the intersection set of the data sets of both parties is often obtained through a private set intersection technology to obtain the calculation or analysis results. However, the existing private set intersection schemes usually expose the size of private intersection to the participants. In some scenarios, malicious participants can indirectly obtain data from the data sets by using the size of the obtained private intersection, for example, through member reasoning, which leads to risks on data security.

Therefore, a new data processing method for data is required.

SUMMARY

The embodiment of the disclosure describes a data processing method and apparatus.

According to a first aspect, it is provided a data processing method, which is executed by a first participant, the method including:

receiving a first set sent by a second participant, wherein the first set is obtained by the second participant shuffling and ID randomizing a plurality of first elements in the second participant set, and replacing first plaintext features of respective first elements with corresponding first homomorphic ciphertexts; constructing imitation elements for a first participant set, shuffling and ID randomizing a collection set of a plurality of second elements in the first participant set and the imitation elements, replacing second plaintext features included in respective elements in the collection set with corresponding second homomorphic ciphertexts to obtain a second set, and sending the second set to the second participant;

receiving a third set sent by a second participant, wherein the third set is obtained by the second participant shuffling and ID randomizing respective elements in the second set, secretly splitting the second homomorphic ciphertext of each element in the second set into a second shared ciphertext and a second shared number, and replacing the second homomorphic ciphertexts with the second shared ciphertexts;

ID randomizing respective elements in the first set to obtain a fourth set, determining an intersection set of the third set and the fourth set, and obtain the first homomorphic ciphertexts corresponding to respective intersection elements in the intersection set from the fourth set; constructing confusion elements for the intersection set, determining first homomorphic ciphertexts corresponding to the confusion elements, and secretly splitting the first homomorphic ciphertext of each intersection element and each confusion element into a first shared ciphertext and a first shared number;

performing secret splitting according to a first preset value to obtain third shared numbers and fourth shared numbers corresponding to respective intersection elements, and performing secret splitting according to a second preset value to obtain third shared numbers and fourth shared numbers corresponding to respective confusion elements, wherein the first preset value and the second preset value are used for indicating authenticity of the elements; constructing a first feature union set according to homomorphic decrypted values, the first shared numbers and the third shared numbers of the second shared ciphertexts of respective intersection elements and respective confusion elements, wherein the first feature union set is used for joint calculation by the first participant; and sending the first shared ciphertexts and the fourth shared numbers corresponding to respective intersection elements and respective confusion elements to the second participant for the second participant to construct a second feature union set, the second feature union set being used for joint calculation by the second participant.

According to a second aspect, it is provided a data processing method, which is executed by a second participant, the method including:

shuffling and ID randomizing a plurality of first elements in a second participant set, replacing first plaintext features of respective first elements with corresponding first homomorphic ciphertexts to obtain a first set, and sending the first set to the first participant;

receiving a second set sent by a first participant, wherein the second set is obtained by the first participant constructing imitation elements for the first participant set, shuffling and ID randomizing a collection set of a plurality of second elements in the first participant set and the imitation elements, and replacing second plaintext features included in respective elements in the collection set with corresponding second homomorphic ciphertexts;

shuffling and ID randomizing respective elements in the second set, secretly splitting the second homomorphic ciphertext of each element in the second set into a second shared ciphertext and a second shared number, replacing the second homomorphic ciphertexts with the second shared ciphertexts to obtain a third set, and sending the third set to the first participant; and receiving first shared ciphertexts and fourth shared numbers corresponding to respective elements in the third set sent by a first participant, wherein the first shared ciphertext corresponds to the first plaintext feature, and the fourth shared number corresponds to a preset value indicating the authenticity of the elements; and constructing a second feature union set according to the homomorphic decrypted values, the second shared numbers and the fourth shared numbers of the first shared ciphertexts, the second feature union set being used for joint calculation by the second participant.

According to a third aspect, it is provided a data processing method, which is executed by a first participant, the method including:

receiving a first set sent by a second participant, wherein the first set is obtained by the second participant shuffling and ID randomizing a plurality of first elements in the second participant set, and replacing first plaintext features of respective first elements with the corresponding first homomorphic ciphertexts; constructing imitation elements for a first participant set, shuffling and ID randomizing a collection set of a plurality of second elements in the first participant set and the imitation elements, replacing second plaintext features included in respective elements in the collection set with corresponding second homomorphic ciphertexts to obtain a second set, and sending the second set to the second participant;

receiving a third set sent by a second participant, wherein the third set is obtained by the second participant shuffling and ID randomizing respective elements in the second set, secretly splitting the second homomorphic ciphertext of each element in the second set into a second shared ciphertext and a second shared number, and replacing the second homomorphic ciphertexts with the second shared ciphertexts; and receiving homomorphic encrypted values of the second shared numbers corresponding to respective data elements of the third set sent by the second participant;

ID randomizing respective elements in the first set to obtain a fourth set, determining an intersection set of the third set and the fourth set, and obtaining the first homomorphic ciphertexts corresponding to respective intersection elements in the intersection set from the fourth set; constructing confusion elements for the intersection set, determining first homomorphic ciphertexts corresponding to the confusion elements, and secretly splitting the first homomorphic ciphertext of each intersection element and each confusion element into a corresponding first shared ciphertext and a first shared number; and performing secret splitting according to a third preset value to obtain fifth shared numbers and sixth shared numbers of respective intersection elements, and performing secret splitting according to a fourth preset value to obtain fifth shared numbers and sixth shared numbers of confusion elements; constructing a third feature union set according to a sum of homomorphic decrypted values of the second shared ciphertexts of respective intersection elements and the fifth shared numbers of respective intersection elements, the first shared numbers of respective intersection elements, and the fifth shared numbers and the first shared numbers of respective confusion elements, wherein the third feature union set is used for joint calculation by the first participant; and sending the homomorphic encrypted values of the second shared numbers of respective intersection elements and the homomorphic sum of the sixth shared numbers and the first shared ciphertexts of respective intersection elements, and the homomorphic encrypted values of the sixth shared numbers and the first shared ciphertexts of respective confusion elements to the second participant for constructing a fourth feature union set, wherein the fourth feature union set is used for joint calculation by the second participant.

According to a fourth aspect, it is provided a data processing method, which is executed by a second participant, the method including:

shuffling and ID randomizing a plurality of first elements in a second participant set, replacing first plaintext features of respective first elements with corresponding homomorphic ciphertexts to obtain a first set, and sending the first set to the first participant;

receiving a second set sent by a first participant, wherein the second set is obtained by the first participant constructing imitation elements for the first participant set, shuffling and ID randomizing a collection set of a plurality of second elements in the first participant set and the imitation elements, and replacing second plaintext features included in respective elements in the collection set with corresponding second homomorphic ciphertexts;

shuffling and ID randomizing respective elements in the second set, secretly splitting the second homomorphic ciphertext of each element in the second set into a second shared ciphertext and a second shared number, replacing the second homomorphic ciphertexts with the second shared ciphertexts to obtain a third set, and sending the third set to the first participant; and sending the homomorphic encrypted values of the second share numbers corresponding to respective data elements of the third set to the first participant; and receiving first shared ciphertexts and secret shared values corresponding to respective elements in the third set sent by a first participant, and by taking the secret shared values as homomorphic calculated values determined according to homomorphic encrypted values of second shared numbers, constructing a fourth feature union set according to the first shared ciphertexts and the secret shared values, wherein the fourth feature union set is used for joint calculation by a second participant.

According to a fifth aspect, it is provided a data processing apparatus deployed on a first participant, the apparatus including:

a transceiving unit, configured to receive a first set sent by a second participant, wherein the first set is obtained by the second participant shuffling and ID randomizing a plurality of first elements in the second participant set, and replacing the first plaintext features of respective first elements with the corresponding first homomorphic ciphertexts; constructing imitation elements for a first participant set, shuffling and ID randomizing a collection set of a plurality of second elements in the first participant set and the imitation elements, replacing second plaintext features included in respective elements in the collection set with corresponding second homomorphic ciphertexts to obtain a second set, and sending the second set to the second participant;

a receiving unit, configured to receive a third set sent by a second participant, wherein the third set is obtained by the second participant shuffling and ID randomizing respective elements in the second set, secretly splitting the second homomorphic ciphertext of each element in the second set into a second shared ciphertext and a second shared number, and replacing the second homomorphic ciphertexts with the second shared ciphertexts;

a processing unit, configured to ID randomize respective elements in the first set to obtain a fourth set, determine the intersection set of the third set and the fourth set, and obtain the first homomorphic ciphertexts corresponding to respective intersection elements in the intersection set from the fourth set; construct confusion elements for the intersection set, determine the first homomorphic ciphertexts corresponding to the confusion elements, and secretly split the first homomorphic ciphertext of each intersection element and each confusion element into a first shared ciphertext and a first shared number; and a construction unit, configured to perform secret splitting according to a first preset value to obtain third shared numbers and fourth shared numbers corresponding to respective intersection elements, and perform secret splitting according to a second preset value to obtain third shared numbers and fourth shared numbers corresponding to respective confusion elements, wherein the first preset value and the second preset value are used for indicating the authenticity of the elements; construct a first feature union set according to the homomorphic decrypted values, the first shared numbers and the third shared numbers of the second shared ciphertexts of respective intersection elements and respective confusion elements, the first feature union set being used for joint calculation by the first participant; and send the first shared ciphertexts and the fourth shared numbers corresponding to respective intersection elements and respective confusion elements to the second participant for the second participant to construct a second feature union set, the second feature union set being used for joint calculation by the second participant.

According to a sixth aspect, it is provided a data processing apparatus deployed on a second participant, the apparatus including:

a first sending unit, configured to shuffle and ID randomize a plurality of first elements in a second participant set, and replace first plaintext features of respective first elements with the corresponding first homomorphic ciphertexts to obtain a first set, and send the first set to the first participant;

a receiving unit, configured to receive a second set sent by a first participant, wherein the second set is obtained by the first participant constructing imitation elements for the first participant set, shuffling and ID randomizing a collection set of a plurality of second elements in the first participant set and the imitation elements, and replacing second plaintext features included in respective elements in the collection set with corresponding second homomorphic ciphertexts;

a second sending unit, configured to shuffle and ID randomize respective elements in the second set, secretly split the second homomorphic ciphertext of each element in the second set into a second shared ciphertext and a second shared number, and replace the second homomorphic ciphertexts with the second shared ciphertexts to obtain a third set, and send the third set to the first participant; and a construction unit, configured to receive first shared ciphertexts and fourth shared numbers corresponding to respective elements in the third set sent by the first participant, wherein the first shared ciphertext corresponds to the first plaintext feature and the fourth shared number corresponds to a preset value indicating the authenticity of the elements; according to the homomorphic decrypted values, the second shared numbers, and the fourth shared numbers of the first shared ciphertexts, construct a second feature union set, the second feature union set being used for joint calculation by the second participant.

According to a seventh aspect, it is provided a computer-readable storage medium on which a computer program is stored, which, when executed in a computer, causes the computer to execute the methods described in the first to fourth aspects.

According to an eighth aspect, it is provided an electronic device, which includes a memory and a processor, wherein executable codes are stored in the memory, and when the processor executes the executable codes, the methods described in the first to fourth aspects are implemented.

Embodiments of the present disclosure provide a data processing method and apparatus. After the first participant determines a private intersection set of a client-side data set and a service-side data set, confusion elements can be added to the private intersection set and a secret-sharing-based identification can be added to the confusion elements, and the confused intersection set is sent to the second participant. By using any one of the above methods, apparatus, storage media and electronic devices, on the premise of ensuring statistical value of the confused intersection set, the second participant can not obtain a real size of the intersection set, thus preventing the second participant from obtaining the data information of the first participant by using the size of the intersection set.

BRIEF DESCRIPTION OF THE DRAWINGS

FIG. 3 shows a flowchart of a data processing method according to an embodiment of the present disclosure;

FIG. 4 shows a flowchart of a data processing method according to another embodiment of the present disclosure;

FIG. 5 shows a flowchart of a data processing method according to yet another embodiment of the present disclosure;

FIG. 6 shows a flowchart of a data processing method according to yet another embodiment of the present disclosure;

DETAILED DESCRIPTION

Figure 1:
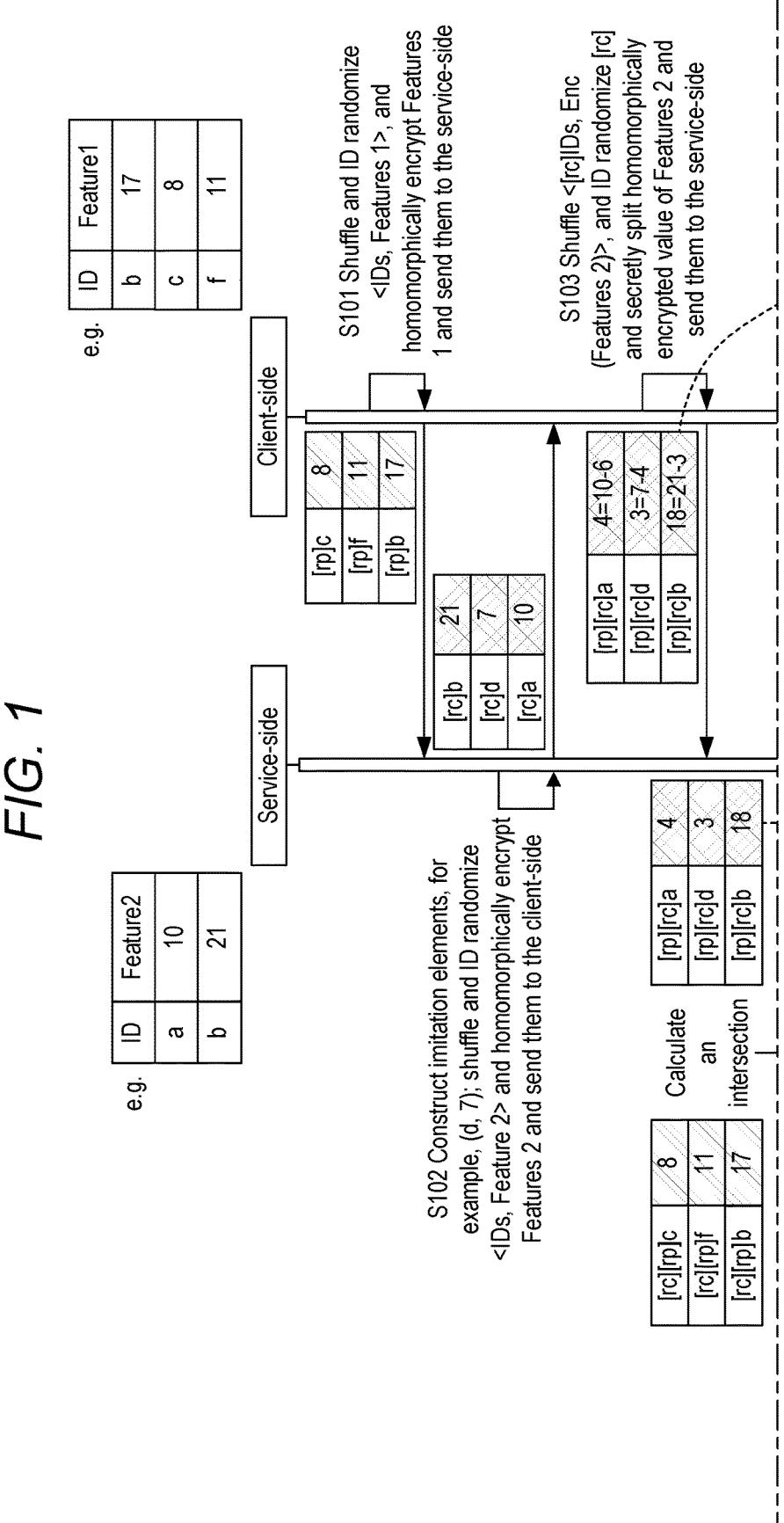
FIG. 1 shows a flowchart of a data processing method according to an embodiment of the present disclosure.
Figure 1:
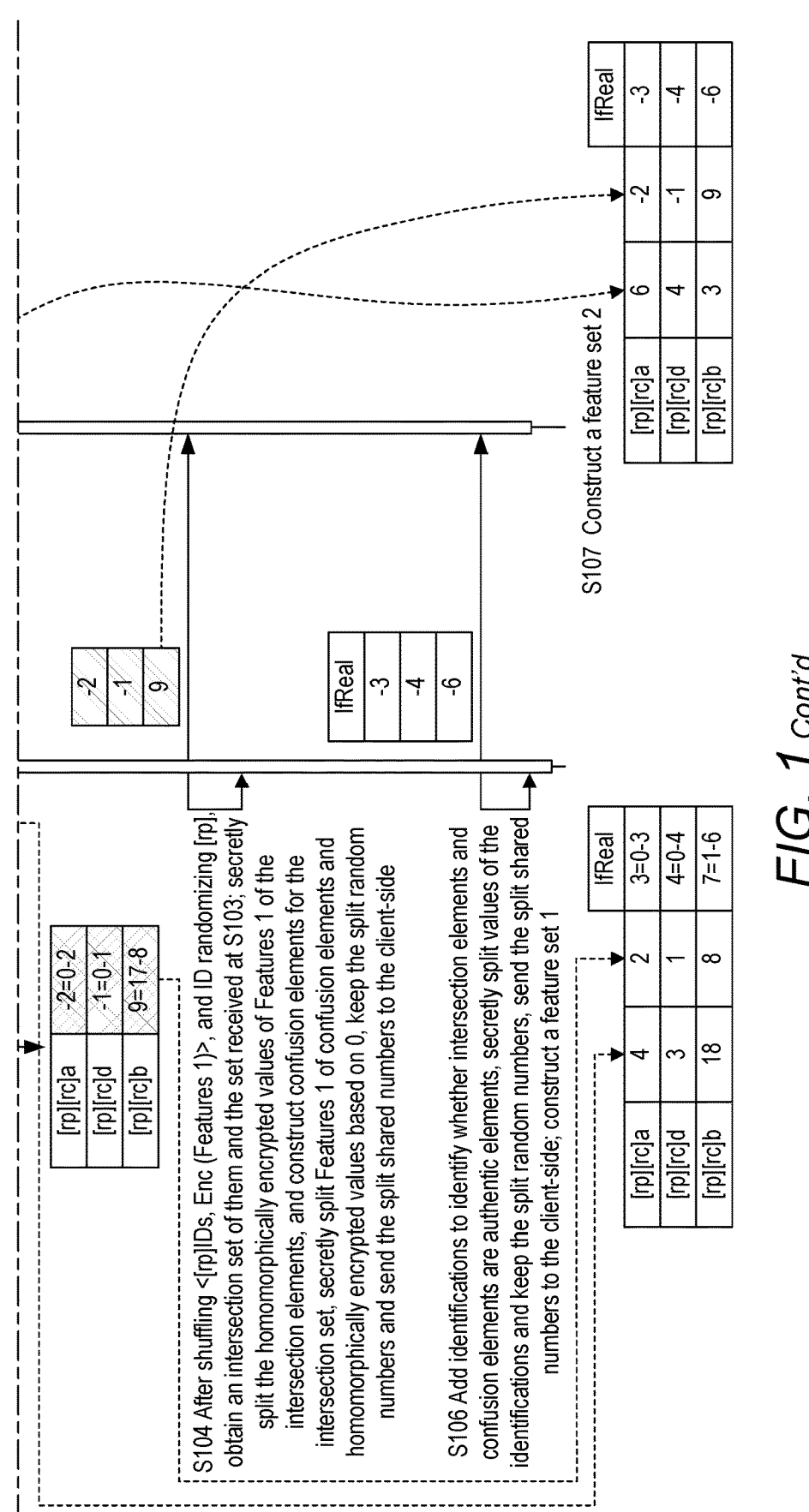

In the following, the technical scheme provided in this specification will be further described in detail with the attached drawings and examples. It can be understood that the specific embodiments described here are only used to explain the related invention, but not to limit the invention. In addition, for the convenience of description, only the parts related to the invention are shown in the attached drawings. It should be noted that the embodiments of the present disclosure and the features in the embodiments may be combined with each other without conflict.

In the description of the implementation of the present disclosure, the term "including" and similar terms should be understood as open inclusion, i.e., "including but not limited to". The term "based on" should be understood as "at least partially based on". The terms "one implementation" or "the implementation" should be understood as "at least one implementation". The term "some implementations" should be understood as "at least some implementations". Other explicit and implicit definitions may be included below.

As mentioned above, in the existing schemes that use the data sets of multiple participants for security calculation or joint analysis, the intersection set of the data sets of both parties is often obtained through the private set intersection technology, and the calculation or analysis results are obtained on this basis. Private Set Intersection (PSI) refers to the intersection set of data held by both parties without revealing any additional information. Here, extra information refers to any information except the data intersection between the two parties. For example, online advertising is a common advertising form at present. One way to measure the effectiveness of advertising is to calculate a conversion rate between browsing actions and purchase actions, i.e., how many purchase actions of corresponding goods or services are performed after the purchase actions. The conversion rate can be calculated by calculating the inter-section set of data (owned by the media) for browsing advertisements and data (owned by advertisers, i.e., goods or services providers) for goods/services transactions without revealing the data held by both parties (such as by calculating a total transaction amount or total transaction volume, etc.). Some existing private intersection calculation schemes mainly ensure the security of data of both parties by not disclosing elements of the data set and their feature information entered by both parties in a private intersection calculation process, including not disclosing the intersection elements included in a private intersection calculation result (i.e., the intersection set of the two data sets) in the data set and their feature information, and not-in-intersection elements used in the operation process but not included in the intersection set and their corresponding feature information.

However, these private intersection schemes also have the following problems: although the feature information of the intersection elements and not-in-intersection elements themselves is not disclosed, the number of the intersection elements or the size of the intersection set will be exposed. In some scenarios, for malicious participants, the information can be indirectly obtained from the data sets by using the obtained quantitative information of intersection elements, and based on the existing background knowledge in a Member Inference manner. For example, in the above example of calculating the conversion rate, for example, the intersection set obtained by a commodity provider usually does not disclose the specific feature information of the intersection elements themselves, so the commodity provider usually cannot know exact commodity purchase information, which can improve data security. However, commodity providers can indirectly obtain a part of commodity purchase information through the size of the intersection set. For example, the commodity provider uses the part of commodity purchase information to have private intersection with the advertisement browsing information at the media side. According to the size of the intersection set, the commodity provider can judge a particular subject who browses advertisements, so as to judge whether the subject buys products by browsing advertisements.

In order to solve the above technical problems, an embodiment of the present disclosure provides a data processing method. FIG. 1 shows a flowchart of a data processing method according to an embodiment of the present disclosure.

First of all, the first participant (for example, a client-side) may, at step S101, shuffle and ID randomize the data elements in the data set of the client-side, and perform homomorphic encryption on the data features (for example, feature 1) of the data elements to obtain a processed data set (called the first set for convenience of description) and send it to the second participant (for example, a server). In different embodiments, the client-side data set may be used for data sets of different specific services, and this specification does not limit this. In one embodiment, the data elements in the client-side data set may include the information, such as the commodity purchase information, etc. The present disclosure does not limit the specific types and contents of the data elements in the client-side data set. Shuffling refers to reordering data elements (or elements for short) in a data set according to predetermined rules or algorithms, thus changing the original order of the data elements in a data set. In different embodiments, the rules or algorithms on which the shuffling is based may be different, and not limited in this specification. In one example, for example, the data elements in the client-side data set may be randomly ordered. For example, as shown in FIG. 1, the client-side data set is $\{(b,17),(c,8),(f,11)\}$, which includes three data elements $(b,17)$, $(c,8)$ and $(f,11)$, and the original order of these elements may be changed, for example, to $\{(c,8),(f,11),(b,17)\}$. Among them, the former component of each element represents an element identification, or called an element ID, and the latter component of each element represents feature data of the element. It should be noted that in different embodiments, the elements in the client-side data set may have multiple feature data, and for the convenience of explanation, one feature (feature 1) is used for description in this example. In the embodiment where the client-side data set element includes multiple features, for the processing of other features, reference can be made to the processing of feature 1.

ID randomization means that a new ID of the data element is obtained by calculating the number of secrets of the party (unknown to other participants) and the IDs of the data elements, thus covering up the original IDs of the data elements and making it impossible for other participants involved in the intersection set to calculate the original IDs reversely. In different embodiments, the specific way of ID randomization may be different. In one embodiment, for example, according to the number (for example, rp) of random secrets of the client-side and the original IDs of respective elements in the client-side data set, the new IDs of respective elements can be calculated, i.e., the respective elements in the client-side data set are ID randomized. For example, $\{[rp]c,[rp]f,[rp]b\}$ can be obtained by ID randomizing the above-mentioned shuffled client-side data set, herein $[rp]c$ represents a new element ID calculated according to the number rp of the secrets and the original element ID c.

Homomorphic Encryption is an encryption method, which is characterized by computing the homomorphic encrypted data to obtain an operation output, and decrypting the operation output. The decryption result is the same as the output result obtained by performing computation according to the unencrypted original data. In different embodiments, different homomorphic encryption algorithms may be used to homomorphically encrypt the features of the respective elements. In one embodiment, the features of the respective elements can be homomorphically encrypted by using a public key of the client-side to obtain the homomorphic encrypted value (or the first homomorphic ciphertext) corresponding to the features of respective elements as above. For example, as shown in FIG. 1, the homomorphic encrypted value of each element is represented as {e1(8), e1(11),e1(17)}, where e1( ) represents the homomorphic encrypted value obtained by homomorphic encryption with the public key of the client-side. In FIG. 1, a numerical value with a twill background represents a homomorphic encrypted value of the numerical value obtained by using the public key of the client-side.

The first set can be obtained after shuffling and ID randomizing the elements of the client-side data set and homomorphically encrypting the element features. The first set can be sent to the server. As shown in FIG. 1, for the client-side data sets {(b,17),(c,8),(f,11)}, the first set obtained is, for example, {([rp]c,e1(8)),([rp]f,e1(11)),([rp]b, e1(17))}.

After receiving the first set, the second participant (for example, a service-side) can construct imitation elements for the service-side set at step S102, shuffle and ID randomize the set of data elements and imitation elements in the service-side set, homomorphically encrypt the features included in respective elements in the set to obtain a second set, and send the second set to the client-side.

Similar to the client-side data set at step S101, in different embodiments, the service-side data set may also be a data set for different specific services, which is not limited by this specification. In one embodiment, the data elements in the service-side data set may include the service-side information, such as the advertisement click information, etc. This disclosure does not limit the specific types and contents of the data elements in the service-side data set. The data elements in the service-side data set may have different data features from the data features in the client-side data set. Similar to the data elements in the client-side data set, in different embodiments, the elements in the service-side data set may also have multiple feature data. For the convenience of explanation, one feature (for example, feature 2) is used for description in this example. In the embodiment where the service-side data set element includes multiple features, for the processing of other features, reference can be made to the processing of feature 2.

According to the structure of the original elements of the service-side set, the imitation elements of the service-side set may be constructed. In one example, for example, imitation elements with the same ID type and feature type can be constructed according to the element ID type and feature data type of the original element. In different embodiments, the number of imitation elements constructed for the service-side set may be different, ranging from 0 to multiple. For example, in one embodiment, when the number of the elements of the service-side set is less than the number of the elements in the received first set, revealing the number of the elements in the service-side set to the client-side may lead to the consequence of revealing the data of the service-side. Therefore, it is desirable to construct imitation elements of a number equal to the difference between the number of the elements in the first set and the number of the elements in the service-side set, merge the imitation elements with the original elements in the service-side set, perform the same data security treatment, and send them to the client-side. In this way, the number of the elements in the set received by the client-side is the same as the number of the elements in the first set sent by the client-side, which will not lead to the consequence of revealing the data of the service-side. In one embodiment, when the number of the elements in the service-side set is equal to or greater than the number of the elements in the received first set, even if the client-side knows the number of the elements in the service-side set, it will usually not lead to the consequence of revealing data. Therefore, the original elements of the service-side collection set can be directly protected and sent to the client-side, and the number of the constructed imitation elements may be zero.

The second set can be obtained and sent to the client-side by shuffling and ID randomizing the collection set of data elements and imitation elements in the service set, and homomorphically encrypting the features (such as features 2) included in respective elements in the collection set. Among them, the specific ways of shuffling and ID randomizing elements of the data set and homomorphically encrypting the element features are similar to the specific ways of shuffling and ID randomizing the data elements in the client-side data set and homomorphically encrypting the data features (such as features 1) of the data elements at step S101, reference can be made to the description at step S101, which will not be repeated here. In one embodiment, the elements in the collection set can be shuffled, the respective elements in the collection set can be ID randomized by using the secret value (for example, rc) of the service-side, and the features (for example, features 2) included in respective elements in the collection set can be homomorphically encrypted. In the example shown in FIG. 1, the service-side collects original elements including (a, 10) and (b, 21), for example, and constructs an imitation element (d,7). In one embodiment, in order to exclude the possibility that the imitation element ID and the subsequently obtained element ID of the intersection set are the same, the imitation element ID with a specific composition, such as the imitation element ID with a specific prefix or suffix and a specific length range, can be constructed to distinguish it from the IDs of other data elements, so as to obtain the collection set {(a, 10), (b, 21), (d, 7)} of original elements and imitation elements. The elements of the collection set are shuffled into, for example, {(b, 21), (d, 7), (a, 10)}. Then they are ID randomized and the features are homomorphically encrypted (to obtain a second homomorphic ciphertext), and the obtained second set is specifically {([rc]b, e2(21)), ([rc]d, e2(7)), ([rc]a, e2(10))}. Herein rc is the number the secrets of the service-side, and e2( ) represents the homomorphic encrypted value obtained by homomorphic encryption using the public key of the service-side. In FIG. 1, a numerical value with a cross-grain background represents a homomorphic encrypted value of the numerical value obtained by using the public key of the service-side.

After receiving the second set, the client-side may, at step 103, re-shuffle the elements in the received second set, and re-ID randomize by using the secret value of the client-side, and secretly split the encrypted features of respective elements in the second set to obtain the secret shared value and shared random number corresponding to respective encrypted features, and replace each encrypted feature of each element with the corresponding secret shared value to obtain a third set and send the third set to the service-side. Secret splitting (also known as secret sharing) mainly refers to randomly splitting a number into two or more numbers that satisfy a specific relationship (for example, the sum of the split numbers is the number being split), and the split numbers can belong to different calculators, and each calculator can carry out calculations under data security according to these shared data. In different embodiments, different specific secret splitting algorithms may be adopted, and this specification does not limit this. In one embodiment, the elements in the collection set can be shuffled, respective elements in the set can be ID randomized by using the secret value of the service-side (for example, rc), and the features (for example, features 2) included in respective elements in the set collection can be homomorphically encrypted. In the example shown in FIG. 1, the received second sets {([rc]b,e2(21)),([rc]d,e2(7)), ([rc]a,e2(10)) can be shuffled, for example, to obtain {([rc]a,e2(10)), ([rc]d,e2(7)), ([rc]b,e2(21))}, and ID randomized by using the random number rp of the client-side to obtain {([rp][rc]a,e2(10)), ([rp][rc]d,e2(7)), ([rp][rc]b,e2(21))}, and then, for example, according to random numbers (for example, 6, 4, 3), the homomorphic encrypted features in the second set are secretly split and the shared ciphertexts (for example, e2(4), e2(3), e2(18)) encrypted by using the public key of the service-side and obtained by splitting are replaced with the homomorphic encrypted features (herein e2(4)=e2(10)−6, e2(3)=e2(7)−4, e2(18)=e2(21)−3, and for example, e2(10)−6 is the homomorphic sum of e2(10) and −6) to obtain a third set {([rp][rc]a,e2(4)), ([rp][rc]d,e2(3)), ([rp][rc]b,e2(18))} and send the third set to the service-side, and the client-side can keep the random number plaintext (the second shared number) obtained by splitting, for example (6,4,3).

After receiving the third set, the service-side may, at step S104, ID randomize the previously received first set again by using the secret number rc of the service-side to obtain, for example, a fourth set, for example, {([rc][rp]c,e1(8)), ([rc][rp]f,e1(11)),([rc][rp]b,e1(17)) as in FIG. 1. For example, the intersection set of the third set and the fourth set is determined according to the IDs of the set elements of the fourth set and the third set (the IDs of both sets are double ID randomized according to the numbers rc and rp of the secrets of the service-side and the client-side and operation results after exchanging the operation order of rc and rp are equal, for example, [rc][rp]b=[rp][rc]b). For the intersection elements in the intersection set, the corresponding first homomorphic ciphertext can be obtained from the fourth set according to the element ID; confusion elements for the intersection set can be constructed, the IDs of confusion elements can be determined according to the IDs of not-in-intersection elements in the third set, and the number of the confusion elements can be determined according to the number of the not-in-intersection elements in the third set. In one embodiment, the number of the confusion elements may be equal to the number of the not-in-intersection elements in the third set. The number of the confusion elements is equal to the number of the not-in-intersection elements in the third set, which can provide better data security. In one embodiment, the number of the confusion elements may be less than the number of the not-in-intersection elements in the third set, and making the number of the confusion elements be less than the number of the not-in-intersection elements in the third set can save computing time and space computing resources. Then, the first homomorphic ciphertexts corresponding to the confusion elements are determined, and the first homomorphic ciphertext of each intersection element and each confusion element is secretly split into the corresponding first shared ciphertext and the first shared number. In different embodiments, the first homomorphic ciphertexts corresponding to the determined confusion elements may be different. In one embodiment, a first homomorphic ciphertext corresponding to a confusion element may be, for example, a homomorphic encrypted value of 0 encrypted by the key of the service-side. For example, as shown in FIG. 1, the intersection element may be ([rc][rp]b), and its corresponding first shared ciphertext and first shared number are e1(9) and 8, and e1 (9)=e1 (17)−8; the confusion elements constructed according to the third set ID may be ([rc][rp]a) and ([rc][rp]d), therein the first shared ciphertext and the first shared ciphertext corresponding to ([rc] [rp]a) are e1(−2) and 2, and the first shared ciphertext and the first shared number corresponding to ([rc][rp]d) are e1(−1) and 1. The first shared number of intersection elements and confusion elements can be kept locally, and the first shared ciphertext can be sent to the client-side. In one embodiment, the first shared ciphertexts can be sent to the client-side according to an arrangement order of the elements in the third set.

At step S106, the service-side can add an identification value (IfReal) to each intersection element and each confusion element to identify them as intersection elements or confusion elements (or to identify them as true elements or pseudo elements). Specifically, secret splitting can be performed according to a first preset value to obtain third shared numbers and fourth shared numbers corresponding to respective intersection elements, and secret splitting can be performed according to a second preset value to obtain third shared numbers and fourth shared numbers corresponding to respective confusion elements, wherein the first preset value and the second preset value are used for indicating authenticity of the element. Then, according to a homomorphic decrypted value, the first shared number and the third shared number of the second shared ciphertext of each intersection element and each confusion element, a first feature union set is constructed. In addition, the first shared ciphertexts and the fourth shared numbers corresponding to respective intersection elements and respective confusion elements are sent to the client-side. In different embodiments, the first preset value and the second preset value may be different specific values respectively. In one embodiment, the first preset value may be 1 and the second preset value may be 0. For example, as shown in FIG. 1, the intersection element may be ([rc][rp]b), and the corresponding third shared number and fourth shared number are 7 and −6, and their sum is 1 (the first preset value); the third shared number and fourth shared number corresponding to the confusion element ([rc][rp]a) are 3 and −3, and their sum is 0 (the second preset value), while the third shared number and fourth shared number corresponding to the confusion element ([rc][rp]d) are 4 and −4, and their sum is 0 (the second preset value).

After receiving the first shared ciphertexts and the fourth shared numbers corresponding to respective intersection elements and respective confusion elements, the client-side can construct a second feature union set according to the homomorphic decrypted values, the second shared numbers and the fourth shared numbers (IfReals) of the first shared ciphertexts of the respective intersection elements and the respective confusion elements at step S107.

Thereafter, the service-side and the client-side can jointly calculate according to the first feature union set and the second feature union set, for example to calculate statistical indicators. In one example, by summing the corresponding features of all the corresponding elements in both sets, the authenticity of the corresponding elements in both sets can be determined according to the sum of authenticity identification values of the corresponding elements, and then statistical indicators can be determined according to feature shared values (the decrypted values of the homomorphic shared ciphertexts) and the feature shared numbers of the true elements stored in both feature sets respectively. Especially when the number of elements of the data sets of both parties is large, this method can effectively protect the real feature data of both parties from being known by the other party during joint calculation, and at the same time ensure that the real number of intersection elements is not known by the client-side, so as to prevent the client-side from obtaining the data of the data set of the service-side.

Figure 2:
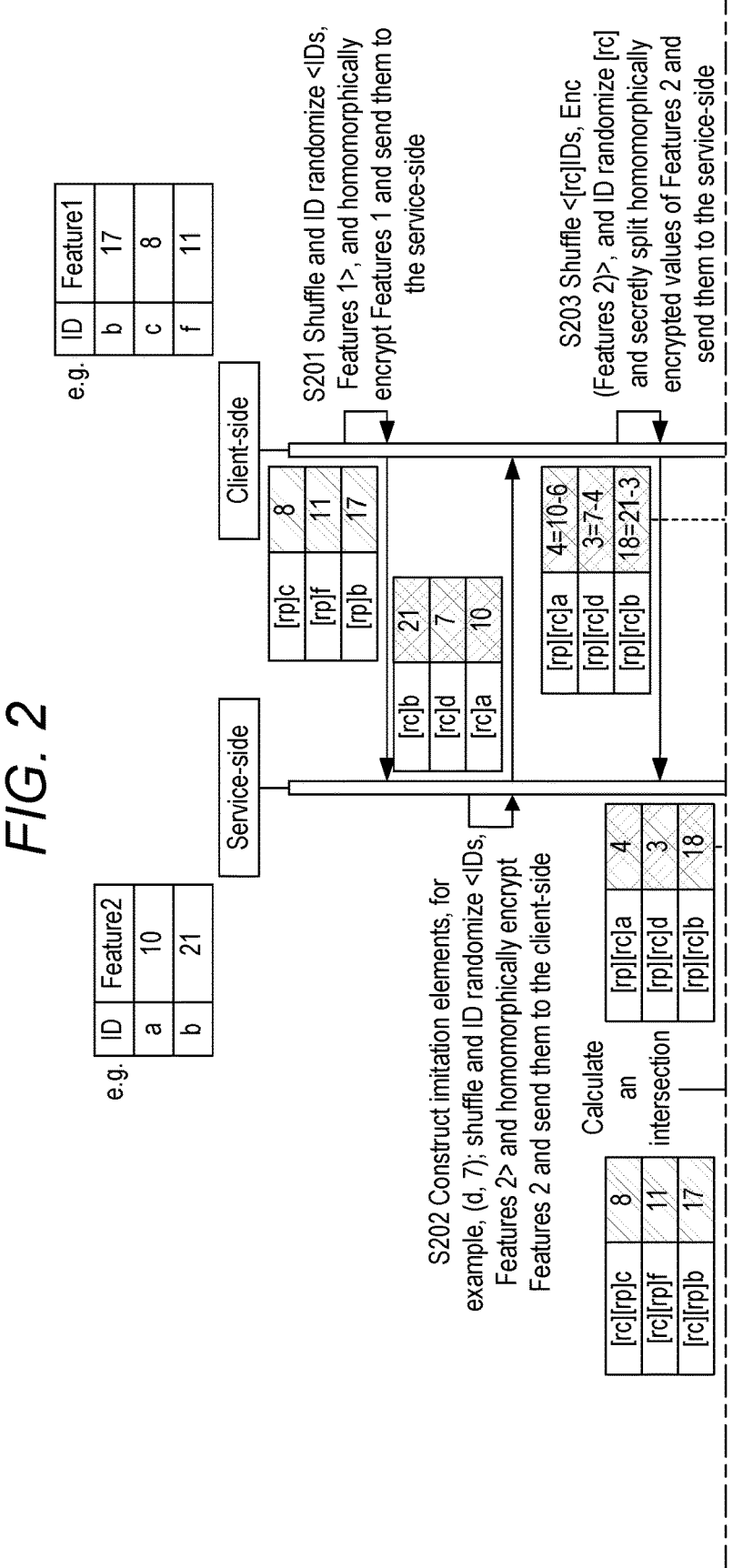
FIG. 2 shows a flowchart of a data processing method according to another embodiment of the present disclosure.
Figure 2:
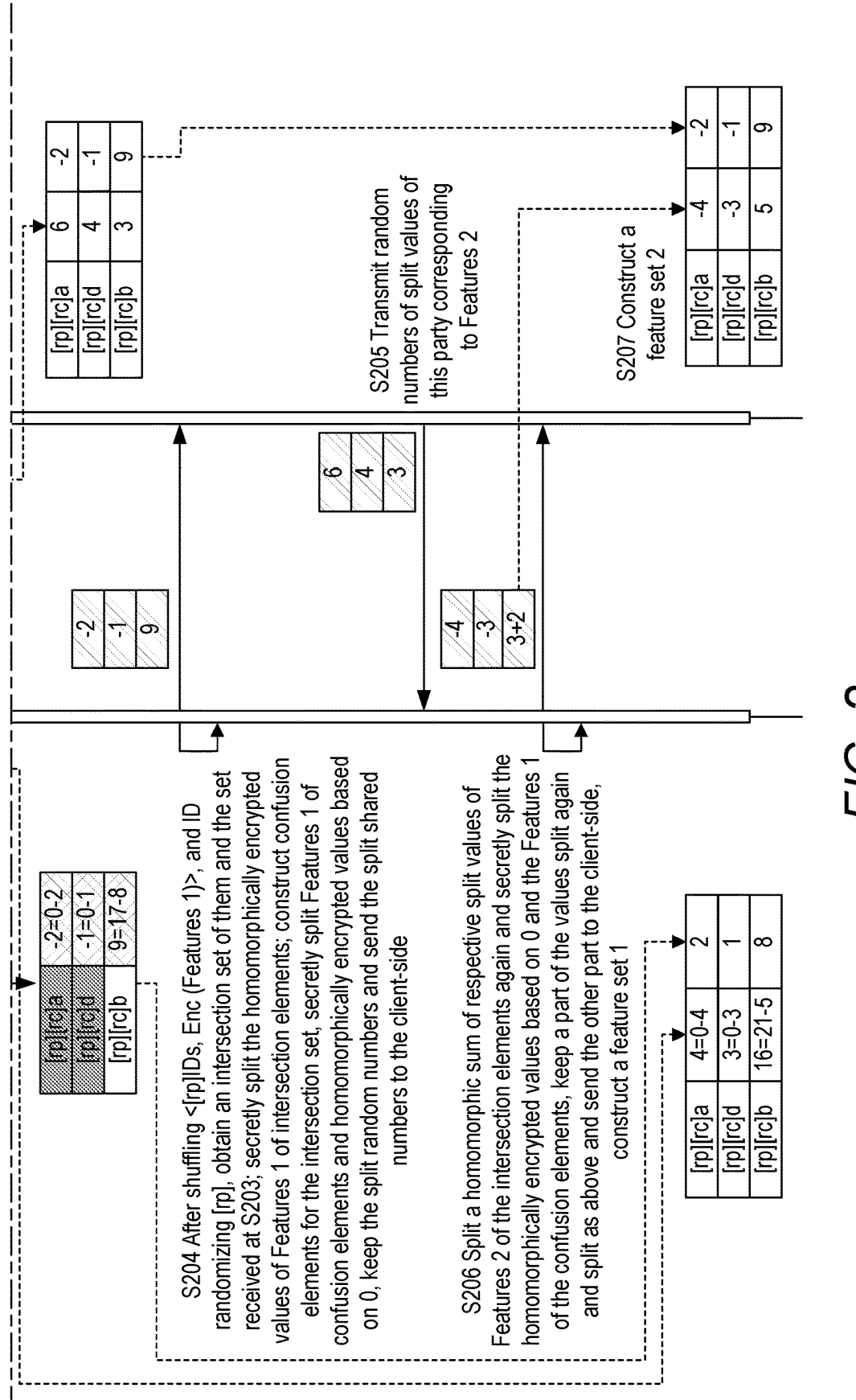

FIG. 2 shows a flowchart of a data processing method according to another embodiment of the present disclosure. As shown in FIG. 2, at first, for example, the client-side may, at step S201, shuffle and ID randomize the data elements in the data set of the client-side, and homomorphically encrypt the data features (for example, features 1) of the data elements to obtain a processed data set (called the first set) and send the processed data set to the service-side. The specific implementation of this step is similar to the implementation of step S101. For details, please refer to the description of step S101, which will not be repeated here.

After receiving the first set, the service-side can construct imitation elements for the service-side set at step S202, shuffle and ID randomize the collection set of data elements and imitation elements in the service-side set, homomorphically encrypt the features included in respective elements in the collection set to obtain a second set, and send the second set to the client-side.

The specific implementation of this step is similar to the implementation of step S102. For details, please refer to the description of step S102, which will not be repeated here.

After receiving the second set, the client-side may, at step S203, re-shuffle the elements in the received second set again, and re-ID randomize with the secret value of the client-side, and secretly split the encrypted features of the respective elements in the second set to obtain the secret shared values and the shared random numbers (second shared numbers) corresponding to respective encrypted features, and replace the respective encrypted features of the respective elements with the corresponding secret shared values to obtain a third set and send the third set to the service-side. The specific implementation of the above process is similar to the implementation of step S103. For details, please refer to the description of step S103, which will not be repeated here. At step S205, the client-side may also send the homomorphic encrypted values of the second shared numbers corresponding to respective data elements in the third set to the service-side. In one embodiment, the homomorphic encrypted values of the second shared numbers can be obtained by encrypting the second shared numbers with the public key of the client-side.

After receiving the third set, the service-side can ID randomize the previously received first set again with the secret number rc of the service-side at step S204, for example, to obtain a fourth set, such as {([rc][rp]c,e1(8)), ([rc][rp]f,e1(11)),([rc][rp]b,e1(17)). For example, the intersection set of the third set and the fourth set is determined according to the IDs of the set elements of the fourth set and the third set (the IDs of both sets are double ID randomized according to the secret numbers rc and rp of the service-side and the client-side and the operation results after exchanging the operation order of rc and rp are equal, for example, [rc][rp]b=[rp][rc]b). For the intersection elements in the intersection set, the corresponding first homomorphic ciphertexts can be obtained from the fourth set according to the element IDs; confusion elements for the intersection can be constructed, the IDs of confusion elements can be determined according to the IDs of not-in-intersection elements in the third set, and the number of the confusion elements may be determined according to the number of the not-inintersection elements in the third set. In one embodiment, the number of the confusion elements may be equal to the number of the not-in-intersection elements in the third set. In one embodiment, the number of the confusion elements may be less than the number of the not-in-intersection elements in the third set. Then, according to the third preset value, the first homomorphic ciphertext corresponding to the confusion element is determined, and the first homomorphic ciphertext of each intersection element and each confusion element is secretly split into the corresponding first shared ciphertext and the first shared number. In different embodiments, the first homomorphic ciphertexts corresponding to the determined confusion elements may be different. In one embodiment, the first homomorphic ciphertexts can be determined according to subsequent statistical indicators. In one embodiment, the statistical indicator may be a specific indicator based on sum operation, and the first homomorphic ciphertext corresponding to the confusion element may be, for example, a homomorphic encrypted value of 0 encrypted by the key of the client-side. In one embodiment, the statistical indicator may be a specific indicator based on the operation of finding a maximum or minimum value, and the first homomorphic ciphertext corresponding to the confusion element may be, for example, a homomorphic encrypted value of the predetermined minimum or maximum value encrypted by the key of the client-side. For example, as shown in FIG. 2, taking the subsequent statistical indicators based on the sum operation as an example, the intersection element may be ([rc][rp]b), and the corresponding first shared ciphertext and first shared number are e1(9) and e1 (9)=e1 (17)−8; the confusion elements constructed according to the third set ID may be ([rc][rp]a) and ([rc][rp]d), the first shared ciphertext and the first shared number corresponding to ([rc] [rp]a) are e1(−2) and 2, and the first shared ciphertext and the first shared number corresponding to ([rc][rp]d) are e1(−1) and 1. The first shared numbers of the intersection elements and the confusion elements may be kept locally, and the first shared ciphertexts can be sent to the client-side. In one embodiment, the first shared ciphertexts can be sent to the client-side according to the arrangement order of the elements in the third set.

At step S206, the service-side can perform secret splitting according to the third preset value to obtain the fifth shared number and the sixth shared number of each intersection element, and perform secret splitting according to the fourth preset value to obtain the fifth shared number and the sixth shared number of the confusion element. Then, according to the sum of the homomorphic decrypted values of the second shared ciphertexts of respective intersection elements and the fifth shared numbers of respective intersection elements, the first shared numbers of respective intersection elements, and the fifth shared numbers and the first shared numbers of respective confusion elements, a third feature union set is constructed. Moreover, the service-side also sends the homomorphic sum of the homomorphic encrypted values of the second shared numbers of respective intersection elements and the sixth shared numbers, the first shared ciphertexts, and the sixth shared number homomorphic ciphertexts and the first shared ciphertexts of respective confusion elements to the client-side for constructing a fourth feature union set. In different embodiments, the third preset value and the fourth preset value may be different specific values respectively. In one embodiment, the third preset value can be determined according to the subsequent statistical indicators. In one embodiment, the statistical indicator can be obtained based on the sum operation, and the third preset value and the fourth preset value may both be 0. For example, as shown in FIG. 2, the fifth shared number and the sixth shared number corresponding to an intersection element ([rc][rp]b) are −2 and 2, and their sum is 0 (the third preset value); the fifth shared number and the sixth shared number corresponding to an confusion element ([rc][rp]a) are 4 and −4, their sum is 0 (the fourth preset value), the fifth shared number and the sixth shared number corresponding to the confusion element ([rc][rp]d) are 3 and −3, and their sum is 0 (the fourth preset value). In one embodiment, the statistical indicator may be a specific indicator based on the operation of finding the maximum value or the minimum value, and the fourth preset value may be, for example, the minimum value or the maximum value within a predetermined value range.

After receiving the homomorphic sum of the second shared numbers and the sixth shared numbers of the respective intersection elements, and the first shared ciphertexts of the respective intersection elements, and the homomorphic ciphertexts and the first shared ciphertexts of the sixth shared numbers of the respective confusion elements, the client-side can construct the fourth feature union set, according to the homomorphic sum of the second shared numbers and the sixth shared numbers of the respective intersection elements, and the first shared ciphertexts, and the homomorphic ciphertexts and the first shared ciphertexts of the sixth shared numbers of the respective confusion elements at step S207.

Thereafter, the service-side and the client-side can jointly calculate according to the third feature union set and the fourth feature union set, for example, calculate statistical indicators. In an example, in a scenario where the fourth preset value is 0, the corresponding features of all the corresponding elements in both sets can be summed up, and the sum of the corresponding features of pseudo elements in both sets are 0, and the sum of the corresponding features of true elements is an available value, so the number of corresponding features of pseudo elements does not affect the calculation results when statistical indicators are calculated based on the sum operation. In another example, in the scenario where the fourth preset value is the minimum value within a predetermined range, the corresponding features of all the corresponding elements in both sets can be summed up, for example, and the maximum value can be obtained. Since the sum of the corresponding features of the pseudo elements in both sets is the minimum value within a predetermined range, the sum of the corresponding features of the real elements is an available value, so the number of the corresponding features of the pseudo elements does not affect the calculation results when the statistical indicators are calculated based on the maximum operation. This method can also effectively protect the real feature data of both parties from being known by the other party during joint calculation, and at the same time ensure that the real number of intersection elements is not known by the client-side, so as to prevent the client-side from obtaining the data of the data set of the service-side.

FIG. 3 shows a flowchart of a data processing method according to an embodiment of the present disclosure. The method is executed by a first participant, and as shown in FIG. 3, the method includes:

At Step S301, a first set sent by a second participant is received, wherein the first set is obtained by the second participant shuffling and ID randomizing a plurality of first elements in the second participant set, and replacing first plaintext features of respective first elements with corresponding first homomorphic ciphertexts; imitation elements for the first participant set are constructed, a collection set of multiple second elements and imitation elements in the first participant set is shuffled and ID randomized, second plaintext features included in respective elements in the collection set are replaced with corresponding second homomorphic ciphertexts to obtain a second set, and the second set is sent to the second participant.

In one embodiment, homomorphic encryption can be performed according to the first plaintext features and a public key of the second participant to obtain first homomorphic ciphertexts; the first plaintext features included in respective first data elements are replaced with the first homomorphic ciphertexts. In one embodiment, homomorphic encryption can be performed according to the second plaintext features and a public key of the first participant to obtain second homomorphic ciphertexts; and the second homomorphic ciphertexts are replaced with the second plaintext features included in the respective data elements in the collection set.

In one embodiment, if the number of the elements in the first set is greater than the number of the elements in the first participant set, imitation elements with a number of the imitation elements being a difference between the number of the elements in the first set and the number of the elements in the first participant set can be constructed; alternatively, if the number of the elements in the first set is less than or equal to the number of the elements in the first participant set, a zero number of imitation elements can be constructed.

At Step S303: a third set sent by the second participant is received, and the third set is obtained by the second participant shuffling and ID randomizing respective elements in the second set, secretly splitting the second homomorphic ciphertext of each element in the second set into a second shared ciphertext and a second shared number, and replacing the second homomorphic ciphertexts with the second shared ciphertexts.

At Step S305: respective elements in the first set are ID randomized to obtain a fourth set, the intersection set of the third set and the fourth set is determined, and the first homomorphic ciphertexts corresponding to respective intersection elements in the intersection set are obtained from the fourth set; confusion elements for the intersection set are constructed, first homomorphic ciphertexts corresponding to the confusion elements are determined, and the first homomorphic ciphertexts of respective intersection elements and respective confusion elements are secretly split into first shared ciphertexts and first shared numbers.

In one embodiment, confusion elements can be constructed with the number of the confusion elements being the number of the not-in-intersection elements in the third set. In one embodiment, confusion elements can be constructed with the number of the confusion elements being less than the number of the not-in-intersection elements in the third set.

At Step S307, secret splitting is performed according to a first preset value to obtain third shared numbers and fourth shared numbers corresponding to respective intersection elements, and secret splitting is performed according to a second preset value to obtain third shared numbers and fourth shared numbers corresponding to respective confusion elements, wherein the first preset value and the second preset value are used for indicating authenticity of the elements; a first feature union set is constructed according to the homomorphic decrypted values, the first shared numbers and the third shared numbers of the second shared ciphertexts of respective intersection elements and respective confusion elements, wherein the first feature union set is used for joint calculation by the first participant; and the first shared ciphertexts and the fourth shared numbers corresponding to respective intersection elements and respective confusion elements are sent to a second participant for the second participant to construct a second feature union set, and the second feature union set is used for joint calculation by the second participant.

In one embodiment, the first preset value may be 1 and the second preset value may be 0.

FIG. 4 shows a flowchart of a data processing method according to another embodiment of the present disclosure. The method is executed by the second participant, as shown in FIG. 4, and the method at least includes the following steps:

At Step S401, a plurality of first elements in a second participant set are shuffled and ID randomized, and the first plaintext features of respective first elements are replaced with corresponding first homomorphic ciphertexts to obtain a first set, and the first set is sent to the first participant;

At Step S403, a second set sent by the first participant is received, wherein the second set is obtained by the first participant constructing imitation elements for the first participant set, shuffling and ID randomizing a collection set of a plurality of second elements in the first participant set and the imitation elements, and replacing the second plaintext features included in respective elements in the collection set with corresponding second homomorphic ciphertexts;

At S405, the elements in the second set are shuffled and ID randomized, the second homomorphic ciphertext of each element in the second set is secretly split into a second shared ciphertext and a second shared number, the second homomorphic ciphertexts are replaced with the second shared ciphertexts to obtain a third set, and the third set is sent to the first participant;

At Step S407, first shared ciphertexts and fourth shared numbers corresponding to respective elements in the third set sent by the first participant are received, wherein the first shared ciphertext corresponds to the first plaintext feature and the fourth shared number corresponds to a preset value indicating the authenticity of the elements; according to homomorphic decrypted values, the second shared numbers and the fourth shared numbers of the first shared ciphertexts, a second feature union set is constructed, and the second feature union set is used for joint calculation by the second participant.

FIG. 5 shows a flowchart of a data processing method according to another embodiment of the present disclosure. The method is executed by the first participant, and as shown in FIG. 5, the method at least includes the following steps:

At step S501, a first set sent by a second participant is received, wherein the first set is obtained by the second participant shuffling and ID randomizing a plurality of first elements in the second participant set, and replacing first plaintext features of respective first elements with corresponding first homomorphic ciphertexts; imitation elements for a first participant set are constructed, a collection set of a plurality of second elements in the first participant set and the imitation elements is shuffled and ID randomized, second plaintext features included in respective elements in the collection set are replaced with corresponding second homomorphic ciphertexts to obtain a second set, and the second set is sent to the second participant;

At step S503, a third set sent by a second participant is received, wherein the third set is obtained by the second participant shuffling and ID randomizing respective elements in the second set, secretly splitting the second homomorphic ciphertext of each element in the second set into a second shared ciphertext and a second shared number, and replacing the second homomorphic ciphertexts with the second shared ciphertexts; and the homomorphic encrypted values of the second shared numbers corresponding to respective data elements of the third set sent by the second participant are received;

At step S505: respective elements in the first set are ID randomized to obtain a fourth set, an intersection set of the third set and the fourth set is determined, and the first homomorphic ciphertexts corresponding to respective intersection elements in the intersection set is obtained from the fourth set; confusion elements for the intersection set are constructed, a first homomorphic ciphertext corresponding to the confusion elements is determined, and the first homomorphic ciphertext of each intersection element and each confusion element is secretly split into a corresponding first shared ciphertext and a first shared number;

At Step S507, secret splitting is performed according to a third preset value to obtain fifth shared numbers and sixth shared numbers of respective intersection elements, and secret splitting is performed according to a fourth preset value to obtain fifth shared numbers and sixth shared numbers of the confusion elements; a third feature union set is constructed according to a sum of homomorphic decrypted values of the second shared ciphertexts of respective intersection elements and the fifth shared numbers of respective intersection elements, the first shared numbers of respective intersection elements, and the fifth shared numbers and the first shared numbers of respective confusion elements, wherein the third feature union set is used for joint calculation by the first participant; and a homomorphic sum of homomorphic encrypted values of the second shared numbers of respective intersection elements and the sixth shared number of respective intersection elements, the first shared ciphertext of respective intersection elements, and the homomorphic encrypted values of the sixth shared numbers of respective confusion elements, and the first shared ciphertext of respective confusion elements are sent to the second participant for constructing a fourth feature union set, wherein the fourth feature union set is used for joint calculation by the second participant.

In one embodiment, the third preset value may be 0 and the fourth preset value may be 0.

FIG. 6 shows a flowchart of a data processing method according to another embodiment of the present disclosure. The method is performed by a second participant. As shown in FIG. 6, the method at least includes the following steps:

At step S601, a plurality of first elements in a second participant set are shuffled and ID randomized, and the first plaintext features of respective first elements are replaced with corresponding homomorphic ciphertexts to obtain a first set, and the first set is sent to the first participant;

At step S603, a second set sent by the first participant is received, wherein the second set is obtained by the first participant constructing imitation elements for the first participant set, shuffling and ID randomizing a collection set of a plurality of second elements in the first participant set and the imitation elements, and replacing the second plaintext features included in respective elements in the collection set with the corresponding second homomorphic ciphertexts;

At step S605, respective elements in the second set are shuffled and ID randomized, the second homomorphic ciphertext of each element in the second set is secretly split into a second shared ciphertext and a second shared number, and the second homomorphic ciphertexts are replaced with the second shared ciphertexts to obtain a third set, and the third set is sent to the first participant; and the homomorphic encrypted values of the second shared numbers corresponding to respective data elements of the third set are sent to the first participant;

At step S607, the first shared ciphertexts and secret shared values corresponding to respective elements in the third set sent by the first participant are received, wherein the first shared ciphertext corresponds to the first plaintext feature. The secret shared values are taken as the homomorphic calculated values determined according to homomorphic encrypted values of second shared numbers, and a fourth feature union set is constructed according to the first shared ciphertexts and the secret shared values, and the fourth feature union set is used for joint calculation by the second participant.

Figure 7:
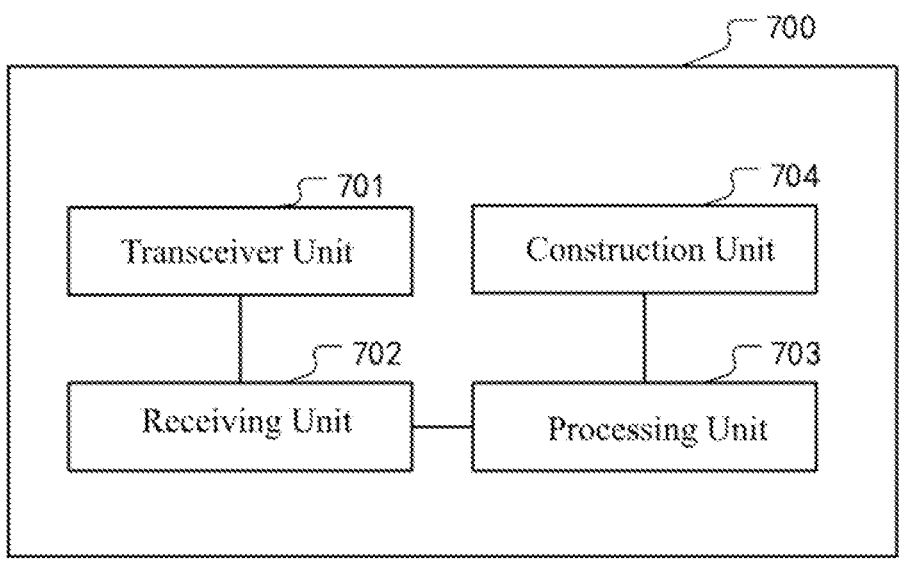
FIG. 7 shows a schematic block diagram of a data processing apparatus according to an embodiment of the present disclosure.

FIG. 7 shows a schematic block diagram of a data processing apparatus according to an embodiment of the present disclosure. The device is deployed on a first participant and used for executing the method shown in FIG. 3. As shown in FIG. 7, the apparatus 700 includes:

a transceiver unit 701, configured to receive a first set sent by a second participant, wherein the first set is obtained by the second participant shuffling and ID randomizing a plurality of first elements in the second participant set, and replacing the first plaintext features of respective first elements with the corresponding first homomorphic ciphertexts; imitation elements for a first participant set are constructed, a collection set of a plurality of second elements in the first participant set and the imitation elements are shuffled and ID randomized, second plaintext features included in respective elements in the collection set are replaced with corresponding second homomorphic ciphertexts to obtain a second set, and the second set is sent to the second participant;

a receiving unit 702, configured to receive a third set sent by a second participant, wherein the third set is obtained by the second participant shuffling and ID randomizing respective elements in the second set, secretly splitting the second homomorphic ciphertext of each element in the second set into a second shared ciphertext and a second shared number, and replacing the second homomorphic ciphertexts with the second shared ciphertexts;

a processing unit 703, configured to ID randomize respective elements in the first set to obtain a fourth set, determine an intersection set of the third set and the fourth set, and obtain the first homomorphic ciphertexts corresponding to respective intersection elements in the intersection set from the fourth set; construct confusion elements for the intersection set, and determine first homomorphic ciphertexts corresponding to the confusion elements, and secretly splitting the first homomorphic ciphertext of each intersection element and each confusion element into a first shared ciphertext and a first shared number;

a construction unit 704, configured to perform secret splitting according to a first preset value to obtain third shared numbers and fourth shared numbers corresponding to respective intersection elements, and perform secret splitting according to a second preset value to obtain third shared numbers and fourth shared numbers corresponding to respective confusion elements; construct a first feature union set according to the homomorphic decrypted values, the first shared numbers and the third shared numbers of the second shared ciphertexts of respective intersection elements and respective confusion elements, wherein the first feature union set is used for joint calculation by the first participant; and send the first shared ciphertexts and the fourth shared numbers corresponding to respective intersection elements and respective confusion elements to a second participant for the second participant to construct a second feature union set, the second feature union set being used for joint calculation by the second participant.

Figure 8:
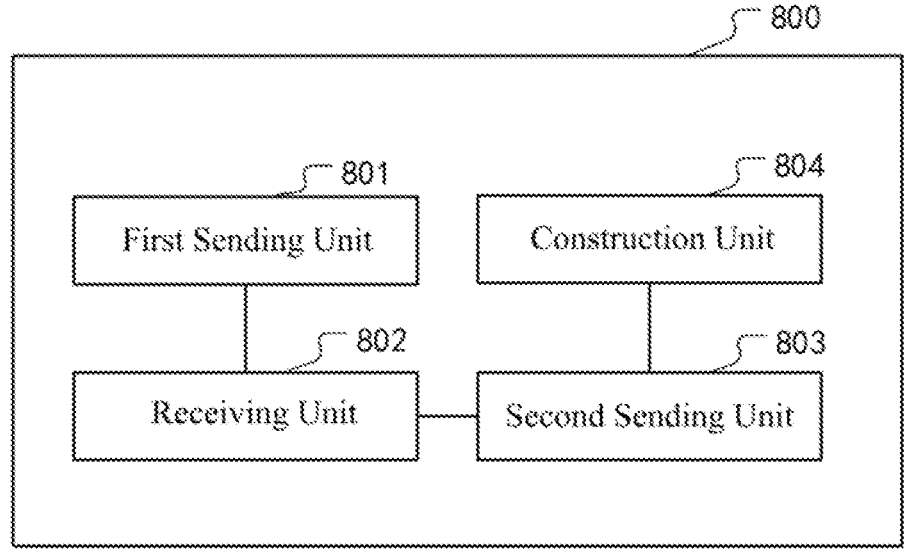
FIG. 8 shows a schematic block diagram of a data processing apparatus according to another embodiment of the present disclosure.

FIG. 8 shows a schematic block diagram of a data processing apparatus according to another embodiment of the present disclosure. The apparatus is deployed on the second participant and used for executing the method shown in FIG. 4. As shown in FIG. 8, the apparatus 800 includes:

a first sending unit 801, configured to shuffle and ID randomize a plurality of first elements in a second participant set, and replace the first plaintext features of respective first elements with the corresponding first homomorphic ciphertexts to obtain a first set, and send the first set to the first participant;

a receiving unit 802, configured to receive a second set sent by a first participant, wherein the second set is obtained by the first participant constructing imitation elements for the first participant set, shuffling and ID randomizing a collection set of a plurality of second elements in the first participant set and the imitation elements, and replacing the second plaintext features included in respective elements in the collection set with the corresponding second homomorphic ciphertexts;

a second sending unit 803, configured to shuffle and ID randomize respective elements in the second set, secretly split the second homomorphic ciphertext of each element in the second set into a second shared ciphertext and a second shared number, and replace the second homomorphic ciphertexts with the second shared ciphertexts to obtain a third set, and send the third set to the first participant; and a construction unit 804, configured to receive first shared ciphertexts and fourth shared numbers corresponding to respective elements in the third set sent by the first participant, wherein the first shared ciphertext corresponds to the first plaintext feature and the fourth shared number corresponds to a preset value indicating the authenticity of the elements; and according to the homomorphic decrypted values, the second shared numbers and the fourth shared numbers of the first shared ciphertexts, construct a second feature union set, the second feature union set being used for joint calculation by the second participant.

Figure 9:
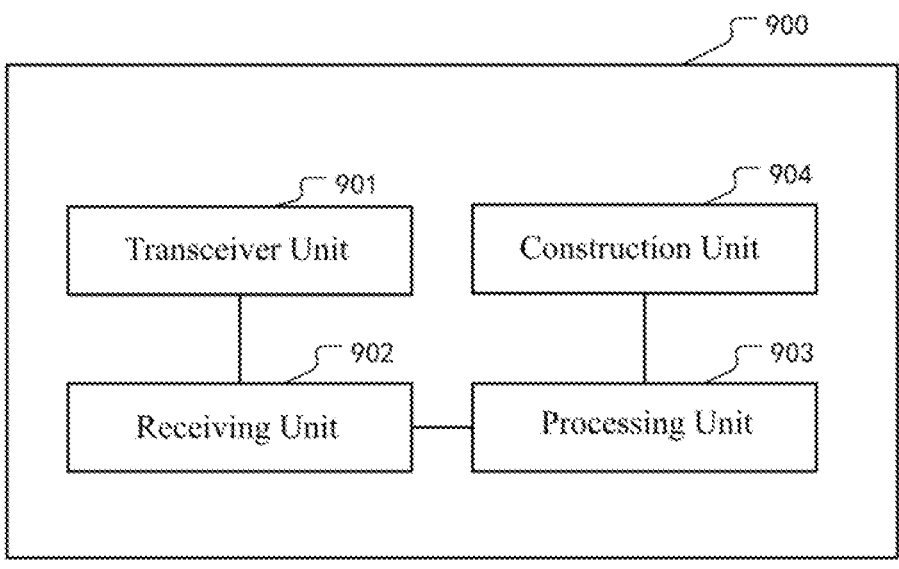
FIG. 9 shows a schematic block diagram of a data processing apparatus according to yet another embodiment of the present disclosure.

FIG. 9 shows a schematic block diagram of a data processing apparatus according to another embodiment of the present disclosure. The apparatus is deployed on a first participant and used for executing the method shown in FIG. 5. As shown in FIG. 9, the apparatus 900 includes:

a transceiver unit 901, configured to receive a first set sent by a second participant, wherein the first set is obtained by the second participant shuffling and ID randomizing a plurality of first elements in the second participant set, and replacing the first plaintext features of respective first elements with the corresponding first homomorphic ciphertexts; construct imitation elements for a first participant set, shuffle and ID randomize a collection set of a plurality of second elements in the first participant set and the imitation elements, replace second plaintext features included in respective elements in the collection set with corresponding second homomorphic ciphertexts to obtain a second set, and send the second set to the second participant;

a receiving unit 902, configured to receive a third set sent by a second participant, wherein the third set is obtained by the second participant shuffling and ID randomizing respective elements in the second set, secretly splitting the second homomorphic ciphertext of each element in the second set into a second shared ciphertext and a second shared number, and replacing the second homomorphic ciphertexts with the second shared ciphertexts; and receive the homomorphic encrypted values of the second shared numbers corresponding to respective data elements of the third set sent by the second participant;

a processing unit 903, configured to ID randomize respective elements in the first set to obtain a fourth set, determine an intersection set of the third set and the fourth set, and obtain the first homomorphic ciphertexts corresponding to respective intersection elements in the intersection set from the fourth set; construct confusion elements for the intersection set, determine first homomorphic ciphertexts corresponding to the confusion elements, and secretly splitting the first homomorphic ciphertext of each intersection element and each confusion element into a corresponding first shared ciphertext and a first shared number; and a construction unit 904, configured to perform secret splitting according to a third preset value to obtain fifth shared numbers and sixth shared numbers of intersection elements, and perform secret splitting according to a fourth preset value to obtain fifth shared numbers and sixth shared numbers of confusion elements; construct a third feature union set according to the sum of homomorphic decrypted values of the second shared ciphertexts of respective intersection elements and the fifth shared numbers of respective intersection elements, the first shared numbers of respective intersection elements, and the fifth shared numbers and the first shared numbers of respective confusion elements, wherein the third feature union set is used for joint calculation by the first participant; and send the homomorphic sum of the second shared numbers and the sixth shared numbers, the first shared ciphertexts of respective intersection elements, and the homomorphic encrypted values of the sixth shared numbers, and the first shared ciphertexts of respective confusion elements to the second participant for constructing a fourth feature union set, wherein the fourth feature union set is used for joint calculation by the second participant.

Figure 10:
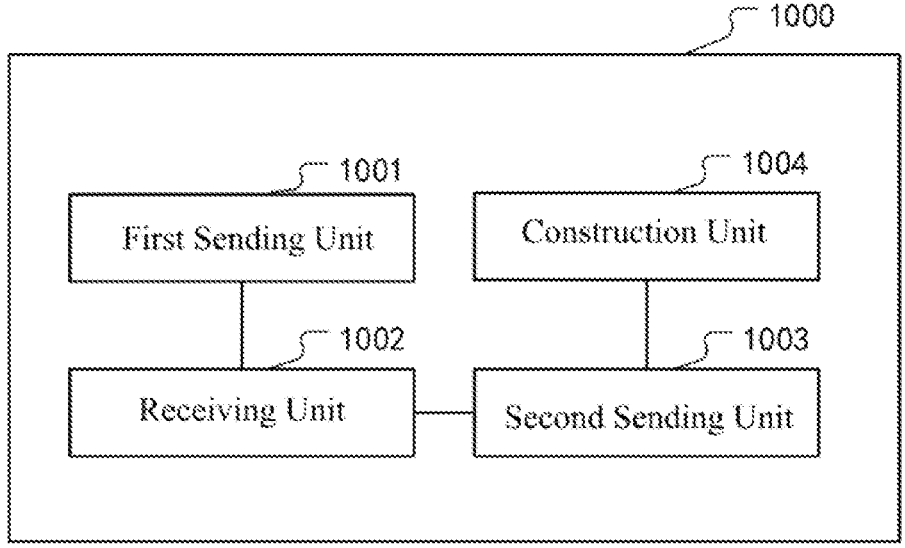
FIG. 10 shows a schematic block diagram of a data processing apparatus according to yet another embodiment of the present disclosure.

FIG. 10 shows a schematic block diagram of a data processing apparatus according to another embodiment of the present disclosure. The apparatus is deployed on a second participant and used for executing the method shown in FIG. 6. As shown in FIG. 10, the apparatus 1000 includes:

a first sending unit 1001, configured to shuffle and ID randomize a plurality of first elements in a second participant set, and replace the first plaintext features of respective first elements with the corresponding homomorphic ciphertexts to obtain a first set, and send the first set to the first participant;

a receiving unit 1002, configured to receive a second set sent by a first participant, wherein the second set is obtained by the first participant constructing imitation elements for the first participant set, shuffling and ID randomizing a collection set of a plurality of second elements in the first participant set and the imitation elements, and replacing the second plaintext features included in respective elements in the collection set with the corresponding second homomorphic ciphertexts;

a second sending unit 1003, configured to shuffle and ID randomize respective elements in the second set, secretly split the second homomorphic ciphertext of each element in the second set into a second shared ciphertext and a second shared number, and replace the second homomorphic ciphertexts with the second shared ciphertexts to obtain a third set, and send the third set to the first participant; and send the homomorphic encrypted values of the second shared numbers corresponding to respective data elements of the third set to the first participant; and a construction unit 1004, configured to receive first shared ciphertexts and secret shared values corresponding to respective elements in the third set sent by a first participant, the first shared ciphertext corresponding to first plaintext features, and by taking the secret shared values as homomorphic calculated values determined according to homomorphic encrypted values of second shared numbers, construct a fourth feature union set according to the first shared ciphertexts and the secret shared values, the fourth feature union set being used for joint calculation by the second participant.

The embodiment of the present disclosure also provides an electronic device, which includes a memory and a processor, wherein the memory stores executable codes, and when the processor executes the executable codes, the method shown in any one of the FIG. 1 to FIG. 6 is implemented.

Figure 11:
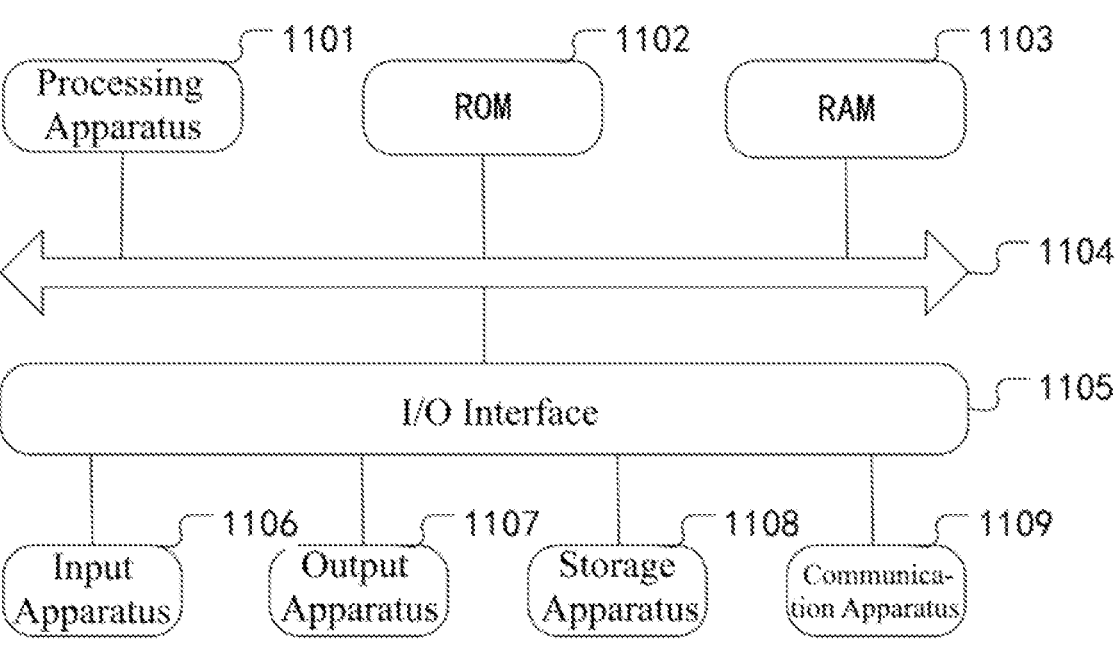
FIG. 11 shows a structural schematic diagram of an electronic device suitable for implementing an embodiment of the present disclosure.

Next, reference may also be made to FIG. 11, which shows a structural schematic diagram of an electronic device 1100 suitable for implementing an embodiment of the present application. The electronic device 1100 shown in FIG. 11 is just an example, and should not bring any restrictions on the function and application scope of the embodiment of the present application.

As shown in FIG. 11, the electronic device 1100 may include a processing apparatus (such as a Central Processing Unit, a graphics processor, etc.) 1101. The processing apparatus 1101 may be a general processor, a Digital Signal Processing (DSP), a microprocessor or a microcontroller, and may further include an Application Specific Integrated Circuit (ASIC), Field-Programmable Gate Array (FPGA) or other programmable logic devices, discrete gate or transistor logic devices, and discrete hardware components, which can perform various appropriate actions and processes according to programs stored in Read-Only Memory (ROM) 1102 or programs loaded from storage apparatus 1108 into Random Access Memory (RAM) 1103. In the RAM 1103, various programs and data required for the operation of the electronic device 1100 are also stored. A processing apparatus 1101, a ROM 1102 and a RAM 1103 are connected to each other through a bus 1104. An input/output (I/O) interface 1105 is also connected to the bus 1104.

Generally, the following apparatuses can be connected to the I/O interface 1105: an input apparatus 1106 including, for example, a touch screen, a touch pad, a keyboard, a mouse, etc.; an output apparatus 1107 including, for example, a Liquid Crystal Display (LCD), a speaker, a vibrator, etc.; a storage apparatus 1108 such as a magnetic tape, a hard disk, etc.; and a communication apparatus 1109. The communication apparatus 1109 may allow the electronic device 1100 to communicate wirelessly or through wires with other devices to exchange data. Although FIG. 7 shows an electronic device 1100 with various apparatuses, it should be understood that it is not required to implement or have all the apparatuses shown. More or fewer apparatuses may alternatively be implemented or provided. Each block shown in FIG. 7 may represent one apparatus or a plurality of apparatuses as required.

In particular, according to an embodiment of the present application, the process described above with reference to the flowchart may be implemented as a computer software program. For example, an embodiment of the present application includes a computer program product, which includes a computer program carried on a computer-readable medium, and the computer program contains program codes for executing the method shown in the flowchart. In such an embodiment, the computer program can be downloaded and installed from the network through the communication apparatus 1109, or installed from the storage apparatus 1108 or from the ROM 1102. When the computer program is executed by the processing apparatus 1101, the above functions defined in the data processing method provided by the embodiment of the present application are executed.

Figure 12:
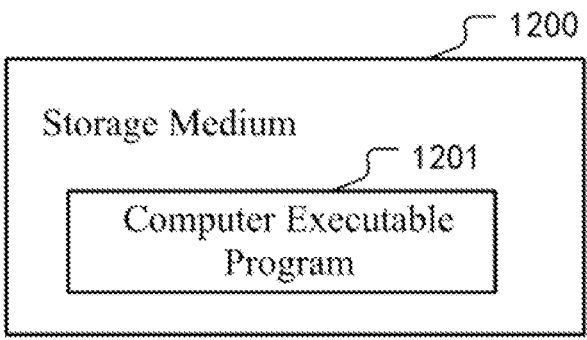
FIG. 12 shows a schematic structural diagram of a storage medium suitable for implementing an embodiment of the present disclosure.

The embodiment of the present disclosure also provides a computer-readable storage medium, on which a computer program is stored, and when the computer program is executed in a computer, the computer is caused to execute the data processing method shown in any one of FIG. 1-FIG. 6 provided by the embodiment of the present application. FIG. 12 is a schematic diagram of a storage medium for implementing an embodiment of the present application. For example, as shown in FIG. 12, the storage medium 1200 may be a non-transitory computer-readable storage medium for storing non-transitory computer-executable instructions 1201. The data processing method provided by the embodiment of the present application can be realized when the non-transitory computer-executable instructions 1201 are executed by the processor. For example, when the non-transitory computer-executable instructions 1201 are executed by the processor, one or more steps of the data processing method provided by the embodiment of the present application can be executed. For example, the storage medium 1200 can be applied to the above-mentioned electronic device, and for example, the storage medium 1200 may include a memory in the electronic device. The description of the storage medium 1200 may refer to the description of the memory in the embodiment of the electronic device, which is not repeated here. The specific functions and technical effects of the storage medium 1200 may refer to the description of the data processing method provided by the embodiment of the present application, and will not be repeated here.

It should be noted that the computer-readable medium described in the embodiment of the present disclosure may be a computer-readable signal medium or a computer-readable storage medium or any combination of the two. The computer-readable storage medium may be, for example, but not limited to, an electrical, magnetic, optical, electromagnetic, infrared, or semiconductor system, apparatus or device, or a combination of any of the above. More specific examples of computer-readable storage media may include, but are not limited to, an electrical connection with one or more wires, a memory card of a smart phone, a storage part of a tablet computer, a portable computer disk, a hard disk of a personal computer, a Random Access Memory (RAM), a Read-Only Memory (ROM), an Erasable Programmable Read-Only Memory (EPROM or flash memory), an optical fiber, a portable Compact Disk Read-Only Memory (CD-ROM), an optical storage device, and a magnetic device. In an embodiment of the present disclosure, a computer-readable storage medium may be any tangible medium containing or storing a program, which may be used by or in combination with an instruction execution system, apparatus or device. In the embodiment of the present disclosure, the computer-readable signal medium may include a data signal propagated in baseband or as a part of a carrier wave, in which computer-readable program codes are carried. This propagated data signal may take many forms, including but not limited to electromagnetic signals, optical signals or any suitable combination of the above. A computer-readable signal medium may also be any computer-readable medium other than a computer-readable storage medium, which can send, propagate or transmit a program for use by or in connection with an instruction execution system, apparatus or device. The program code contained in the computer-readable medium can be transmitted by any suitable medium, including but not limited to: wires, optical cables, Radio Frequency (RF), etc., or any suitable combination of the above.

The computer-readable medium may be included in the electronic device; or it may exist alone without being assembled into the electronic device. The computer-readable medium carries one or more programs, which, when executed by the server, enable the electronic device to realize the data processing method provided by the embodiment of the application.

Computer program codes for performing the operations of embodiments of the present disclosure may be written in one or more programming languages or their combinations, including object-oriented programming languages such as Java, Smalltalk, C++, and conventional procedural programming languages such as "C" language or similar programming languages. The program code may be completely executed on the computer, partially executed on the computer, executed as an independent software package, partially executed on the computer and partially executed on a remote computer, or completely executed on a remote computer or server. In the case involving a remote computer, the remote computer may be connected to a computer through any kind of network, including a Local Area Network (LAN) or a Wide Area Network (WAN), or may be connected to an external computer (for example, through the Internet using an Internet service provider).

The flowcharts and block diagrams in the drawings illustrate architecture, functions and operations of possible implementations of systems, methods and computer program products according to various embodiments of the present disclosure. In this regard, each block in the flowchart or block diagram may represent a module, a program segment, or a part of code that contains one or more executable instructions for implementing specified logical functions. It should also be noted that in some alternative implementations, the functions noted in the blocks may occur in an order different from the order noted in the drawings. For example, two blocks shown in succession may actually be executed substantially in parallel, and they may sometimes be executed in the reverse order, depending on the functions involved. It should also be noted that each block in the block diagrams and/or flowcharts, and combinations of blocks in the block diagrams and/or flowcharts, may be implemented by a dedicated hardware-based system that performs specified functions or operations, or by a combination of dedicated hardware and computer instructions. The units involved in the embodiment described in the present disclosure may be realized by software or hardware. Among them, the name of the unit does not constitute the limitation of the unit itself in some cases. The functions described above herein may be at least partially performed by one or more hardware logic components. For example, without limitation, exemplary types of hardware logic components that can be used include: Field Programmable Gate Array (FPGA), Application Specific Integrated Circuit (ASIC), Application Specific Standard Product (ASSP), System on Chip (SOC), Complex Programmable Logic Device (CPLD) and so on.

Each embodiment in this specification is described in a progressive way, and only the same and similar parts between the embodiments can be referred to each other, and each embodiment focuses on the differences from other embodiments. In particular, for the storage medium and the computing device embodiment, because it is basically similar to the method embodiment, the description is relatively simple, and the relevant points can only be found in part of the description of the method embodiment.

The above description is only the preferred embodiment of the present disclosure and the explanation of the applied technical principles. It should be understood by those skilled in the art that the disclosure scope involved in this disclosure is not limited to the technical scheme formed by the specific combination of the above technical features, but also covers other technical schemes formed by any combination of the above technical features or their equivalent features without departing from the above disclosure concept. For example, the above features are replaced with (but not limited to) technical features with similar functions disclosed in this disclosure. Furthermore, although the operations are depicted in a particular order, this should not be understood as requiring that these operations be performed in the particular order shown or in a sequential order. Under certain circumstances, multitasking and parallel processing may be beneficial. Likewise, although several specific implementation details are contained in the above discussion, these should not be construed as limiting the scope of the present disclosure. Some features described in the context of separate embodiments can also be combined in a single embodiment. On the contrary, various features described in the context of a single embodiment may also be implemented in multiple embodiments individually or in any suitable subcombination.

The specific embodiment described above further details the purpose, technical scheme and beneficial effects of the embodiment of the present invention. Although the subject matter has been described in language specific to structural features and/or methodological logical acts, it should be understood that the subject matter defined in the appended claims is not necessarily limited to the specific features or acts described above. On the contrary, the specific features and actions described above are only exemplary forms of implementing the claims. It should be understood that the above is only the specific implementation of the embodiment of the present invention, and it is not used to limit the protection scope of the present invention. Any modification, equivalent substitution, improvement, etc. made on the basis of the technical scheme of the present invention should be included in the protection scope of the present invention.

What is claimed is:

1. A data processing method executed by a first participant, the method comprising:

receiving a first set sent by a second participant, wherein the first set is obtained by the second participant shuffling and ID randomizing a plurality of first elements in the second participant set, and replacing first plaintext features of respective first elements with corresponding first homomorphic ciphertexts; constructing imitation elements for a first participant set, shuffling and ID randomizing a collection set of a plurality of second elements in the first participant set and the imitation elements, replacing second plaintext features included in respective elements in the collection set with corresponding second homomorphic ciphertexts to obtain a second set, and sending the second set to the second participant;

receiving a third set sent by a second participant, wherein the third set is obtained by the second participant shuffling and ID randomizing respective elements in the second set, secretly splitting the second homomorphic ciphertext of each element in the second set into a second shared ciphertext and a second shared number, and replacing the second homomorphic ciphertexts with the second shared ciphertexts;

ID randomizing respective elements in the first set to obtain a fourth set, determining an intersection set of the third set and the fourth set, and obtain the first homomorphic ciphertexts corresponding to respective intersection elements in the intersection set from the fourth set; constructing confusion elements for the intersection set, determining first homomorphic ciphertexts corresponding to the confusion elements, and secretly splitting the first homomorphic ciphertext of each intersection element and each confusion element into a first shared ciphertext and a first shared number; and performing secret splitting according to a first preset value to obtain third shared numbers and fourth shared numbers corresponding to respective intersection elements, and performing secret splitting according to a second preset value to obtain third shared numbers and fourth shared numbers corresponding to respective confusion elements, wherein the first preset value and the second preset value are used for indicating authenticity of the elements; constructing a first feature union set according to homomorphic decrypted values, the first shared numbers and the third shared numbers of the second shared ciphertexts of respective intersection elements and respective confusion elements, wherein the first feature union set is used for joint calculation by the first participant; and sending the first shared ciphertexts and the fourth shared numbers corresponding to respective intersection elements and respective confusion elements to the second participant for the second participant to construct a second feature union set, the second feature union set being used for joint calculation by the second participant.

2. The method according to claim 1, wherein the replacing the first plaintext features of respective first elements with the corresponding first homomorphic ciphertexts includes:

performing homomorphic encryption according to the first plaintext features and a public key of the second participant to obtain the first homomorphic ciphertexts; and replacing the first plaintext features included in respective first elements with the first homomorphic ciphertexts;

wherein the replacing second plaintext features included in respective elements in the collection set with the corresponding second homomorphic ciphertexts includes:

performing homomorphic encryption according to the second plaintext features and a public key of the first participant to obtain second homomorphic ciphertexts; and replacing the second plaintext features included in respective elements in the collection set with the second homomorphic ciphertexts.

3. The method according to claim 1, wherein the constructing the imitation elements for the first participant set includes:

if a number of the elements in the first set is greater than a number of the elements in the first participant set, constructing imitation elements with a number of the imitation elements being a difference between the number of the elements in the first set and the number of the elements in the first participant set; or if the number of the elements in the first set is less than or equal to the number of the elements in the first participant set, constructing a zero number of imitation elements.

4. The method according to claim 1, wherein the constructing the confusion elements for the intersection set includes:

constructing confusion elements with a number of the confusion elements being a number of not-in-intersection elements in the third set; or constructing confusion elements with a number of the confusion elements being less than the number of not-in-intersection elements in the third set.

5. The method according to claim 1, wherein the first preset value is 1 and the second preset value is 0.

6. A data processing method executed by a second participant, the method comprising:

shuffling and ID randomizing a plurality of first elements in a second participant set, replacing first plaintext features of respective first elements with corresponding homomorphic ciphertexts to obtain a first set, and sending the first set to a first participant;

receiving a second set sent by the first participant, wherein the second set is obtained by the first participant constructing imitation elements for the first participant set, shuffling and ID randomizing a collection set of a plurality of second elements in the first participant set and the imitation elements, and replacing second plaintext features included in respective elements in the collection set with corresponding second homomorphic ciphertexts;

shuffling and ID randomizing respective elements in the second set, secretly splitting a second homomorphic ciphertext of each element in the second set into a second shared ciphertext and a second shared number, replacing the second homomorphic ciphertexts with the second shared ciphertexts to obtain a third set, and sending the third set to the first participant; and receiving first shared ciphertexts and fourth shared numbers corresponding to respective elements in the third set sent by the first participant, wherein the first shared ciphertext corresponds to the first plaintext feature, and the fourth shared number corresponds to a preset value indicating authenticity of the elements; according to homomorphic decrypted values, the second shared numbers and the fourth shared numbers of the first shared ciphertexts, constructing a second feature union set, the second feature union set being used for joint calculation by the second participant.

7. A data processing method executed by a first participant, the method comprising:

receiving a first set sent by a second participant, wherein the first set is obtained by the second participant shuffling and ID randomizing a plurality of first elements in the second participant set, and replacing first plaintext features of respective first elements with the corresponding first homomorphic ciphertexts; constructing imitation elements for a first participant set, shuffling and ID randomizing a collection set of a plurality of second elements in the first participant set and the imitation elements, replacing second plaintext features included in respective elements in the collection set with corresponding second homomorphic ciphertexts to obtain a second set, and sending the second set to the second participant;

receiving a third set sent by a second participant, wherein the third set is obtained by the second participant shuffling and ID randomizing respective elements in the second set, secretly splitting a second homomorphic ciphertext of each element in the second set into a second shared ciphertext and a second shared number, and replacing the second homomorphic ciphertexts with the second shared ciphertexts; and receiving homomorphic encrypted values of the second shared numbers corresponding to the elements of the third set sent by the second participant;

ID randomizing respective elements in the first set to obtain a fourth set, determining an intersection set of the third set and the fourth set, and obtaining the first homomorphic ciphertexts corresponding to respective intersection elements in the intersection set from the fourth set; constructing confusion elements for the intersection set, determining first homomorphic ciphertexts corresponding to the confusion elements, and secretly splitting the first homomorphic ciphertext of each intersection element and each confusion element into a corresponding first shared ciphertext and a first shared number; and performing secret splitting according to a third preset value to obtain fifth shared numbers and sixth shared numbers of respective intersection elements, and performing secret splitting according to a fourth preset value to obtain fifth shared numbers and sixth shared numbers of confusion elements; constructing a third feature union set according to a sum of homomorphic decrypted values of the second shared ciphertexts of respective intersection elements and the fifth shared numbers of respective intersection elements, the first shared numbers of respective intersection elements, and the fifth shared numbers and the first shared numbers of respective confusion elements, wherein the third feature union set is used for joint calculation by the first participant; and sending a homomorphic sum of the homomorphic encrypted values of the second shared numbers of respective intersection elements and the sixth shared numbers of respective intersection elements, the first shared ciphertexts of respective intersection elements, and the homomorphic encrypted values of the sixth shared numbers of respective confusion elements and the first shared ciphertexts of respective confusion elements to the second participant for constructing a fourth feature union set, the fourth feature union set being used for joint calculation by the second participant.

8. The method according to claim 7, wherein the third preset value is 0 and the fourth preset value is 0.

9. The method according to claim 7, wherein a data processing method executed by the second participant comprises:

shuffling and ID randomizing a plurality of first elements in a second participant set, replacing first plaintext features of respective first elements with corresponding homomorphic ciphertexts to obtain a first set, and sending the first set to the first participant;

receiving a second set sent by a first participant, wherein the second set is obtained by the first participant constructing imitation elements for the first participant set, shuffling and ID randomizing a collection set of a plurality of second elements in the first participant set and the imitation elements, and replacing second plaintext features included in respective elements in the collection set with corresponding second homomorphic ciphertexts;

shuffling and ID randomizing respective elements in the second set, secretly splitting the second homomorphic ciphertext of each element in the second set into a second shared ciphertext and a second shared number, replacing the second homomorphic ciphertexts with the second shared ciphertexts to obtain a third set, and sending the third set to the first participant; and sending homomorphic encrypted values of the second shared numbers corresponding to respective elements of the third set to the first participant; and receiving first shared ciphertexts and secret shared values corresponding to respective elements in the third set sent by the first participant, the first shared ciphertext corresponding to a first plaintext feature, and constructing a fourth feature union set according to the first shared ciphertexts and the secret shared values by taking the secret shared values as homomorphic calculated values determined according to the homomorphic encrypted values of second shared numbers, the fourth feature union set being used for joint calculation by a second participant.

* * * * *